(12) United States Patent
Sakurai

(10) Patent No.: US 10,567,368 B2
(45) Date of Patent: Feb. 18, 2020

(54) SYSTEM FOR MANAGEMENT OF A MONITOR APPARATUS MONITORING A DEVICE IN A CUSTOMER ENVIRONMENT

(71) Applicant: CANON KABUSHIKI KAISHA, Tokyo (JP)

(72) Inventor: Yuka Sakurai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 284 days.

(21) Appl. No.: 15/476,522

(22) Filed: Mar. 31, 2017

(65) Prior Publication Data
US 2017/0295164 A1  Oct. 12, 2017

(30) Foreign Application Priority Data

Apr. 11, 2016 (JP) .................................. 2016-078586

(51) Int. Cl.
*H04L 29/06* (2006.01)
*G06F 8/61* (2018.01)

(52) U.S. Cl.
CPC ............ *H04L 63/0807* (2013.01); *G06F 8/62* (2013.01); *H04L 63/062* (2013.01)

(58) Field of Classification Search
CPC .................................. H04L 63/00; G06F 21/00
See application file for complete search history.

(56) References Cited

U.S. PATENT DOCUMENTS

2005/0160007 A1* 7/2005 Nita ...................... G06Q 20/206
                                                                    705/18
2008/0104687 A1* 5/2008 Fujiwara ............... H04W 12/02
                                                                    726/10

FOREIGN PATENT DOCUMENTS

JP          2009-271680 A     11/2009

* cited by examiner

*Primary Examiner* — Joseph P Hirl
*Assistant Examiner* — Leynna T Truvan
(74) *Attorney, Agent, or Firm* — Canon U.S.A., Inc. IP Division

(57) ABSTRACT

To install a monitor apparatus module, a monitor apparatus transmits a registration request including a client ID and an initial authentication key included in an installer to a management apparatus. When an authentication key related to the client ID included in the registration request is yet to be issued, the management apparatus issues an authentication key and provides the same to the monitor apparatus. Meanwhile, when the authentication key is already issued, the monitor apparatus displays a screen for input of a ticket issued by the management apparatus and resends the initial registration request with the input ticket to the management apparatus. When the ticket included in the registration request is valid, the management apparatus issues the authentication key and provides the same to the monitor apparatus.

6 Claims, 17 Drawing Sheets

FIG. 6

| CustomerID | CUSTOMER NAME | ADDRESS | SERVICE TYPE | ... |
|---|---|---|---|---|
| Customer01 | CUSTOMER A | Tokyo... | counterSrv,statusSrv,jobSrv,settingSrv | |
| Customer02 | CUSTOMER B | kyoto... | counterSrv,statusSrv | |
| Customer03 | CUSTOMER C | Osaka... | statusSrv,jobSrv | |
| Customer04 | CUSTOMER D | Tokyo... | counterSrv,statusSrv | |

| CustomerID | DeviceID | PRODUCT NAME | IP ADDRESS | MAC ADDRESS | SERIAL NUMBER | SERVICE TYPE | ClientID | ... |
|---|---|---|---|---|---|---|---|---|
| Customer01 | Dev01 | DeviceA | 1.1.1.1 | 00:00:00:00:00:00 | SerialNum01 | counterSrv | Client01 | |
| Customer01 | Dev01 | DeviceA | 1.1.1.1 | 00:00:00:00:00:00 | SerialNum01 | statusSrv | Client01 | |
| Customer01 | Dev01 | DeviceA | 1.1.1.1 | 00:00:00:00:00:00 | SerialNum01 | jobSrv | Client01 | |
| Customer01 | Dev01 | DeviceA | 1.1.1.1 | 00:00:00:00:00:00 | SerialNum01 | settingSrv | Client01 | |
| Customer01 | Dev02 | DeviceB | 1.1.1.2 | 00:00:00:00:00:01 | SerialNum02 | statusSrv | Client01 | |
| Customer01 | Dev02 | DeviceB | 1.1.1.2 | 00:00:00:00:00:01 | SerialNum02 | jobSrv | Client01 | |
| Customer02 | Dev03 | DeviceA | 2.2.2.2 | 22:22:22:22:22:22 | SerialNum03 | counterSrv | Client02 | |
| Customer02 | Dev03 | DeviceA | 2.2.2.2 | 22:22:22:22:22:22 | SerialNum03 | statusSrv | Client02 | |

| CustomerID | ClientID | INITIAL AUTHENTICATION KEY | AUTHENTICATION KEY | AUTHENTICATION KEY ISSUANCE DATE AND TIME | PROVISIONAL AUTHENTICATION KEY | PROVISIONAL AUTHENTICATION KEY ISSUANCE DATE AND TIME | TICKET | TICKET EXPIRATION DATE AND TIME | ... |
|---|---|---|---|---|---|---|---|---|---|
| Customer01 | Client01 | vm4-dfm-5id-fn3 | 3jdn-sm3w-96mc-ddez | 2015/3/1 0:00 | ig3k-gnd8-ogsx-p3id | 2015/9/1 0:00 | 19ba-ab82-ac4v | 2015/9/2 0:00 | |
| Customer02 | Client02 | opf-276-fs9-gm1 | 4ogm-so3p-84px-vmrd | 2015/3/10 0:00 | 4ogm-so3p-84px-vmrd | 2015/8/24 0:00 | 8gnc-gb2x-gj59 | 2015/8/25 0:00 | |
| Customer03 | Client03 | gh0-3c8-fp9-exb | | | | | | | |

| CustomerID (901) | DeviceID (902) | SERVICE TYPE (903) | FINAL RECEPTION DATE AND TIME (904) | ... |
|---|---|---|---|---|
| Customer01 | Dev01 | counterSrv | 2015/8/31 23:44 | |
| Customer01 | Dev01 | statusSrv | 2015/8/30 10:00 | |
| Customer01 | Dev01 | jobSrv | 2015/9/1 0:15 | |
| Customer01 | Dev01 | settingSrv | 2015/9/1 0:16 | |

FIG. 10

| DeviceID (1001) | IP ADDRESS (1002) | MAC ADDRESS (1003) | ... |
|---|---|---|---|
| Dev01 | 1.1.1.1 | 00:00:00:00:00 | |
| Dev02 | 1.1.1.2 | 00:00:00:00:01 | |

MONITORING SERVICE

| DeviceID | IP ADDRESS | MAC ADDRESS | ... |
|---|---|---|---|
| Dev01 | 1.1.1.1 | 00:00:00:00:00 | |

COUNTER SERVICE

SYSTEM FOR MANAGEMENT OF A MONITOR APPARATUS MONITORING A DEVICE IN A CUSTOMER ENVIRONMENT

BACKGROUND

Field

The present disclosure relates to a system including a management system and a monitor apparatus connectable to the management system via a network to monitor a device in a customer environment.

Description of the Related Art

There have been conventional device management systems that collect and analyze operation information, counter information, and the like from devices typified by image formation apparatuses such as composite machines. Some of the device management systems include a monitor apparatus that collects device information and a management apparatus that manages the information collected by the monitor apparatus. In this case, for the monitor apparatus and the management apparatus to communicate with each other, an authentication key is used with consideration given to security.

After being installed at a customer site, the monitor apparatus is not necessarily operated permanently, but in some cases needs to be replaced with a new monitor apparatus due to a failure or at an arbitrary timing with technological advances. Even after the process of replacing the monitor apparatus, it is necessary to smoothly collect device information.

Japanese Patent Laid-Open No. 2009-271680 discloses a technique for transferring, from one MFP to another, a license for activating software functions of the one MFP to enable the functions to be used in the other MFP.

After the process of replacing the monitor apparatus, the monitor apparatus and the management apparatus need to be set again, thereby increasing the load of the replacement work.

In a specific case, in order to distribute the authentication key necessary for communications between the monitor apparatus and the management apparatus, the authentication key issued to each monitor apparatus is included in a software installer to provide the functions of the monitor apparatus from the viewpoints of convenience and security. In that case, since the monitor apparatus and the installer are associated with each other, when the monitor apparatus is replaced, the replacement monitor apparatus is recognized as a different monitor apparatus. This requires that initial settings be set to the new monitor apparatus and the management apparatus, thereby placing a burden on an administrator or the like who performs the replacement work.

SUMMARY

A system includes a management system, a first information processing apparatus, and a second information processing apparatus. The management system includes a generation unit that, based on an instruction to generate a ticket specifying monitor apparatus identification information used by the first information processing apparatus operating as a monitor apparatus, generates ticket information related to the monitor apparatus identification information, and provides the generated ticket information, a first reception unit that receives from the second information processing apparatus a registration request for an information processing apparatus to operate as a monitor apparatus, the registration request including monitor apparatus identification information and first authentication information for use at a time of an initial communication between the first information processing apparatus and the management system, a determination unit that determines whether second authentication information related to the monitor apparatus identification information and used for communication between the information processing apparatus to operating as a monitor apparatus after registration in response to the registration request and the management system is yet to be issued based on the monitor apparatus identification and the first authentication information included in the registration request, and an issuing unit that, when the determination unit determines that the second authentication information is yet to be issued, issues the second authentication information related to the monitor apparatus identification information included in the registration request and provides the issued second authentication information to the second information processing apparatus. The second information processing apparatus includes a transmission unit that transmits the registration request to the management system, a second reception unit that receives the second authentication information from the management system, and an input unit that accepts input of the ticket information. When the ticket information is input from the input unit, the transmission unit transmits the ticket information to the management system. The first reception unit can receive the ticket information from the second information processing apparatus. In a case where the determination unit determines that the second authentication information is previously issued, when the ticket information received by the first reception unit coincides with the ticket information related to the monitor apparatus identification information on which the second authentication information is determined to be previously issued, the issuing unit reissues second authentication information different from the previously issued second authentication information and provides the reissued second authentication information to the second information processing apparatus.

Further features will become apparent from the following description of exemplary embodiments (with reference to the attached drawings).

BRIEF DESCRIPTION OF THE DRAWINGS

FIG. 6 is a diagram illustrating an example of customer list in the management apparatus.

FIG. 7 is a diagram illustrating an example of device list in the management apparatus.

FIG. 8 is a diagram illustrating an example of monitor apparatus list in the management apparatus.

FIG. 9 is a diagram illustrating an example of data management list by service in the management apparatus.

FIG. 10 is a diagram illustrating an example of service-based device management list in the monitor apparatus.

DESCRIPTION OF THE EMBODIMENTS

<Description of a System Block Diagram>

Figure 1:
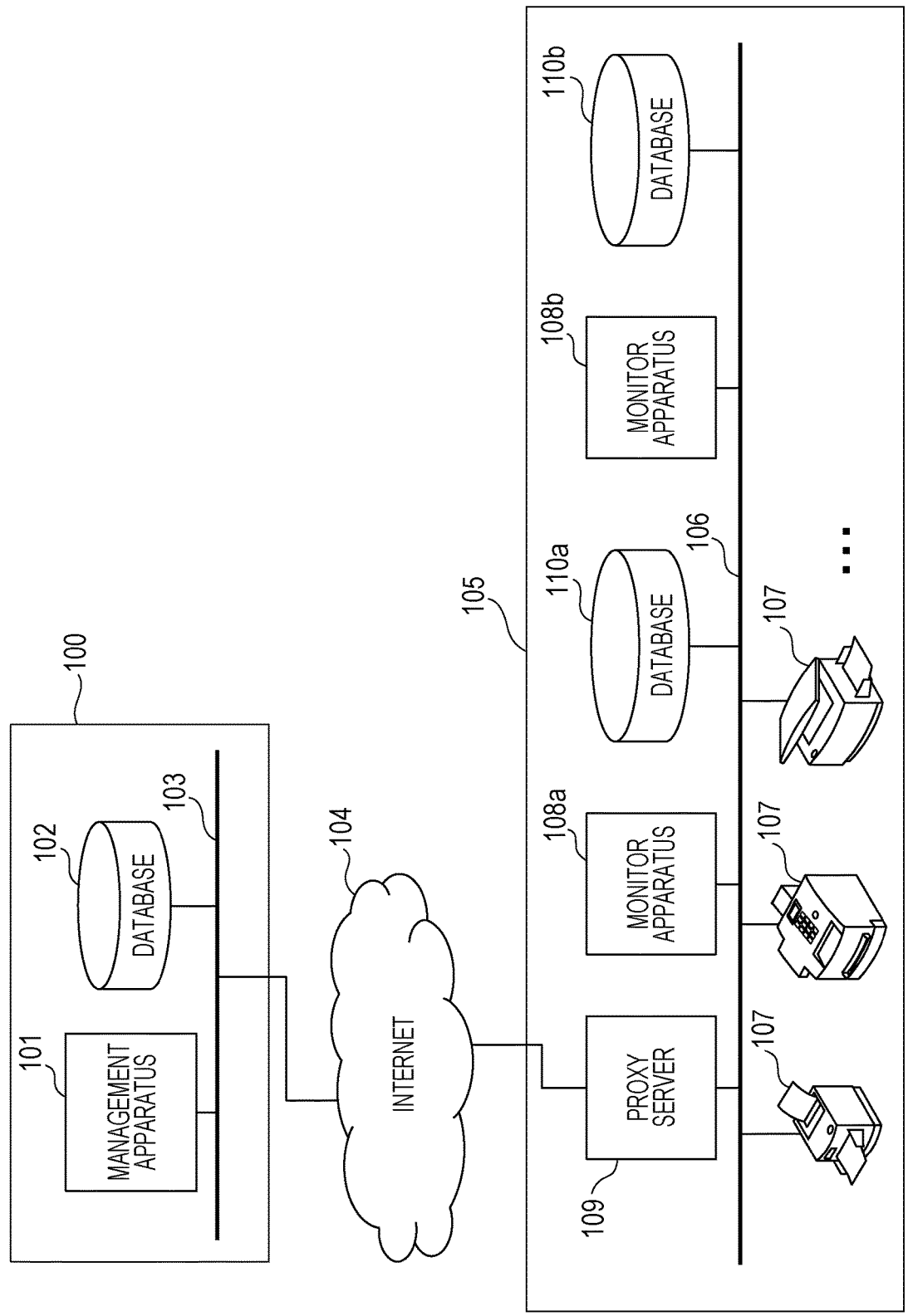
FIG. 1 is a block diagram of an example of entire configuration of a system according to an example.

FIG. 1 is a block diagram of an entire configuration of a system according to an exemplary embodiment.

A device management system 100 includes a management apparatus 101 on which a Web application designed to manage device information on devices 107 installed in a customer environment 105 operates. In the example, status monitoring information such as counter information, job logs, and errors, and set value information set in the devices 107 will be used as an example of the device information. However, the device information can be any other information as far as it relates to the devices.

The device management system 100 includes the management apparatus 101 and a database 102. The management apparatus 101 stores in the database 102 the device information acquired from the devices 107 and various kinds of information necessary for management of the devices 107. The database 102 and the management apparatus 101 are connected to each other on a LAN 103. The LAN 103 is connectable to the Internet 104. The database 102 can physically exist in the management apparatus 101. The database 102 can also exist in another location via the Internet 104 as far as it is accessible from the management apparatus 101.

The management apparatus 101 can provide a web page for viewing the information stored in the database 102 or processed information on a web browser operating on a personal computer (PC) or the like connected over the Internet 104 or the like. The management apparatus 101 provides the web page in the state where the viewable contents are limited by user authentication on an authority basis. The management apparatus 101 can also change part of data stored in the database 102 from the web page. Various kinds of information necessary for operating the device management system 100 is registered from the web page on a customer basis by a person in charge with specific authority. An example of the registered information is management information of the devices 107 as management targets and a monitor apparatus 108 exchanging information with the devices 107.

The customer environment 105 includes the devices 107 and the monitor apparatus 108 connected to a local area network (LAN) 106. A Web application designed to monitor the devices 107 connected to the LAN 106 operates on the monitor apparatus 108. The monitor apparatus 108 communicates with the management apparatus 101 via a proxy server 109 on the Internet 104. The monitor apparatus 108 stores in a database 110 device information collected from the devices 107, set value information to be delivered to the devices 107, and others. The database 110 is connected to the LAN 106, but can independently exist in the monitor apparatus 108. The database 110 can exist in another location via the Internet 104 as far as it is accessible from the monitor apparatus 108.

The monitor apparatus 108 regularly transmits the device information stored in the database 110 to the management apparatus 101. The transmission is carried out at a timing in accordance with a schedule set by the management apparatus 101. In time for the schedule, the monitor apparatus 108 acquires the device information in advance from the devices 107 and stores the same in the database 110. The monitor apparatus 108 can provide a web page for viewing the information stored in the database 110 and exchanging data with the management apparatus 101 on a web browser operating on a PC or the like.

The monitor apparatus 108 may need to be replaced due to a failure or at an arbitrary timing with advances in technology. The monitor apparatus 108 is an information processing apparatus that can operate as a monitor apparatus by installing a program for operating a computer as a monitor apparatus configured to monitor devices in a customer environment into an information processing apparatus (PC or the like). By performing a replacement process described below, the PC operating as a monitor apparatus can be replaced with another PC. In the example described below, a monitor apparatus 108a and a database 110a are replaced with a monitor apparatus 108b and a database 110b. That is, the monitor apparatus 108a is regarded as pre-replacement old monitor apparatus and the monitor apparatus 108b is as post-replacement new monitor apparatus. For description purposes, when there is no need to differentiate between the monitor apparatus 108a and the monitor apparatus 108b, the term "monitor apparatus 108" is used.

<Diagram Illustrating a H/W Configuration of the Management Apparatus 101 and the Monitor Apparatus 108>

Figure 2:
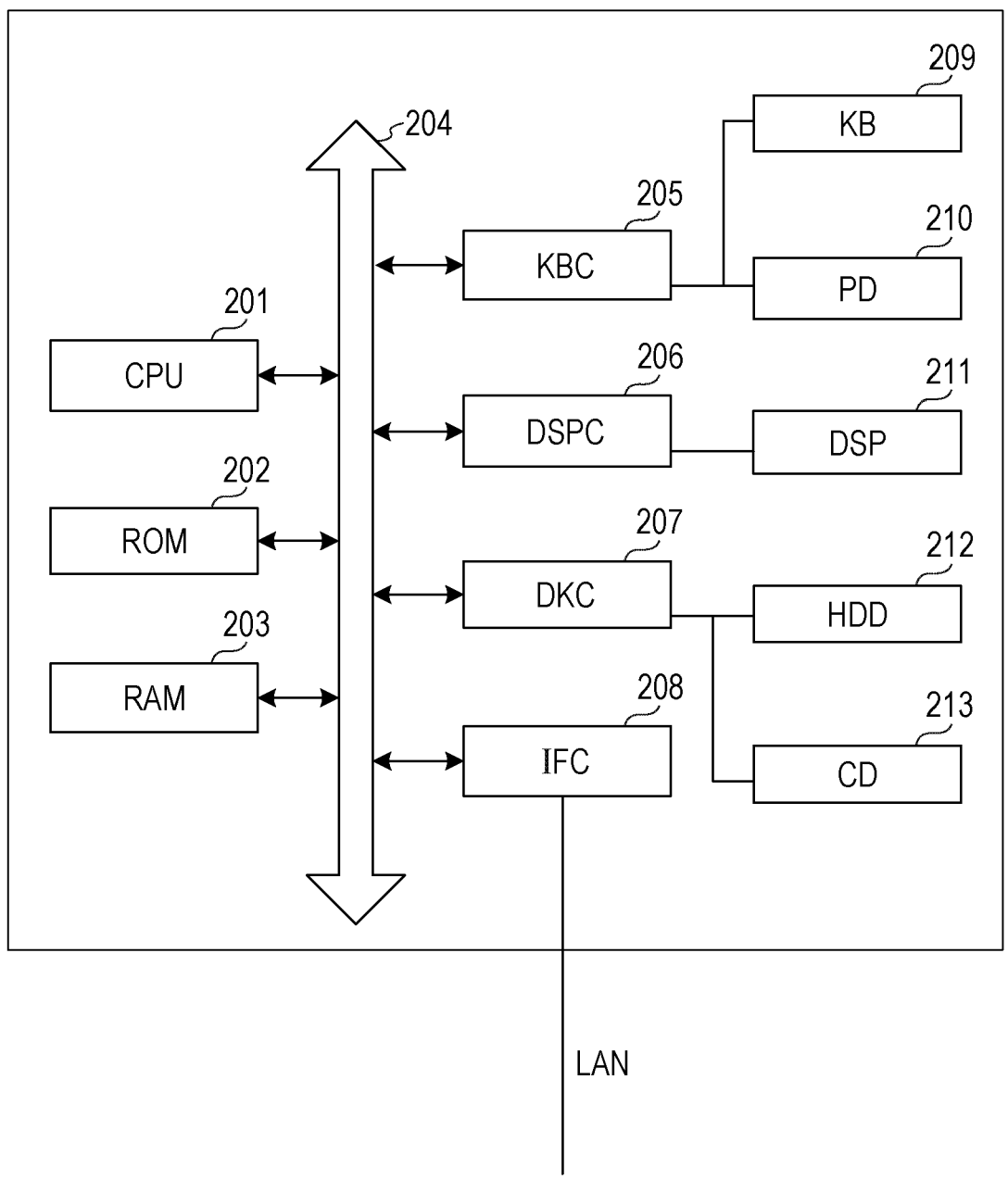
FIG. 2 is a hardware block diagram of a management apparatus and a monitor apparatus.

FIG. 2 is a hardware block diagram of the management apparatus 101 and the monitor apparatus 108. The configuration illustrated in this block diagram is also applicable to configurations of the proxy server 109 and other not illustrated information apparatuses installed at the back end.

A CPU 201 controls the entire apparatus. In the following description, the CPU 201 is the agent of execution on hardware unless otherwise specified. Meanwhile, the agent of control on software is a software program stored in a hard disk (HDD) 212. In the following description, the HDD 212 stores the software program related to this example as the agent of action.

A ROM 202 stores BIOS, boot program and others. A RAM 203 acts as a main memory, a work area, and the like for the CPU 201. The CPU 201 executes various kinds of control by reading the program from the HDD 212, the ROM 202, and others and executing the same.

A keyboard controller (KBC) 205 controls instruction inputting from a keyboard (KB) 209, a pointing device (PD) 210, and the like. A display controller (DSPC) 206 controls display on a display (DSP) 211.

A disk controller (DKC) 207 controls access to memories such as the HDD 212 and the CD-ROM (CD) 213. The HDD 212, the CD 213, and the like store a boot program, an operating system (OS), a database, a software program, and data thereof, and others. Instead of or in addition to the HDD 212, another memory such as a solid-state drive (SSD) can be included.

An interface controller (IFC) 208 transmits and receives information to and from other network devices via a LAN.

The foregoing components (201 to 203 and 205 to 208) are arranged on a system bus 204. In addition, the OS is, for example, Microsoft® Windows®, but is not limited to this.

The software program related to the example can be supplied in such a manner that it is stored in a storage medium such as a CD-ROM. In that case, the program is read by the CD 213 illustrated in FIG. 2 or the like from the storage medium and installed in the HDD 212.

<Diagram Illustrating a H/W Configuration of the Device 107>

Figure 3:
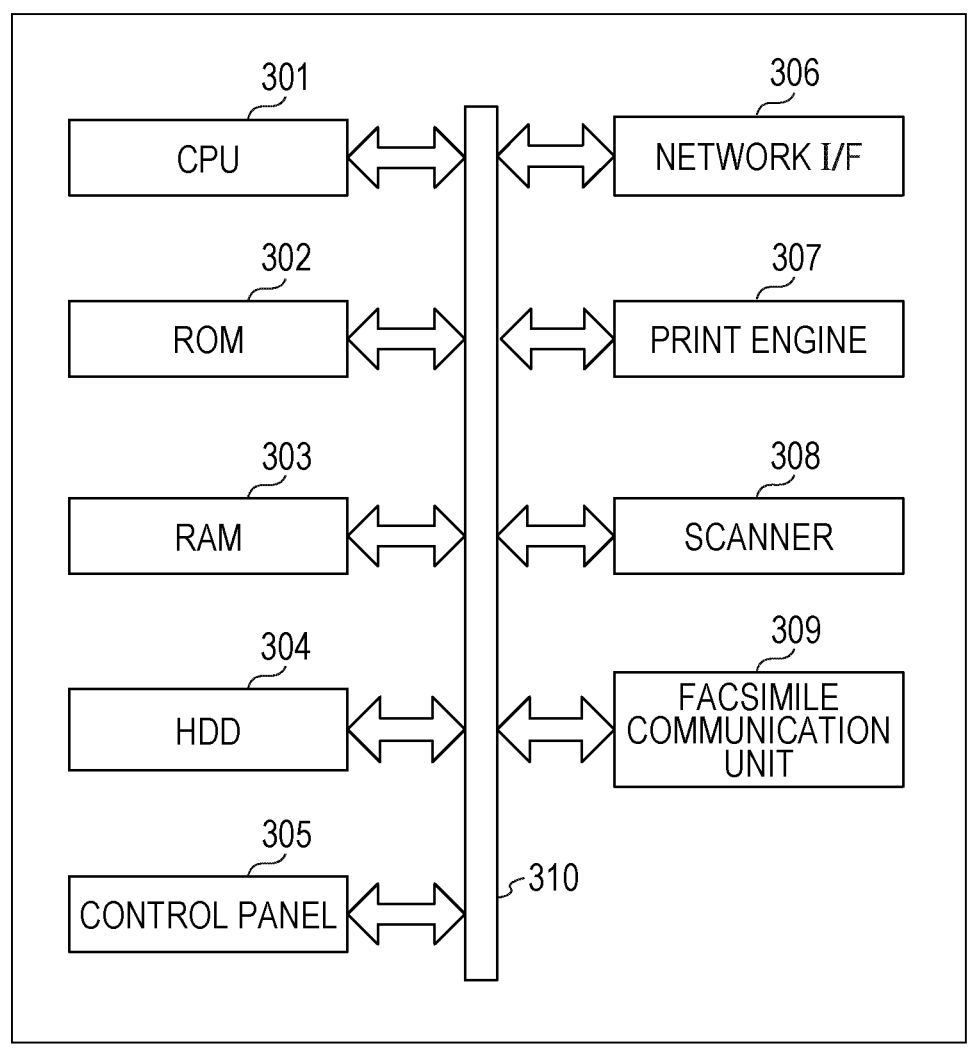
FIG. 3 is a hardware block diagram of a device.

FIG. 3 is a hardware block diagram of a composite machine as an example of the device 107. The following description assumes that an example of the device 107 is a composite machine including a print function, a scanner function, a network communication function, and others. However, the device 107 is not limited to the composite machine and can be any network device. For example, the device 107 can be a printing device (printer), a network camera, an in-car terminal, any one of various network home electronics, or the like.

A CPU 301 controls the entire device 107. A ROM 302 stores a print processing program executed by the CPU 301, font data, and others. A RAM 303 is used as a work area for the CPU 301, a reception buffer, and is used for image rendering, and others. An HDD 304 records set value information on the device 107, and others. Instead of or in addition to the HDD 304, another memory such as an SSD can be included.

A control panel 305 is composed of various switches and buttons, and a liquid crystal display for display of messages. A user can operate the set value information on the control panel 305. A network interface 306 is for connection to a network. A print engine 307 produces print on recording paper. A scanner 308 reads original documents. A facsimile communication unit 309 sends and receives facsimiles. The components described above are arranged on a system bus 310.

<Diagram Illustrating a Software Configuration of the Management Apparatus 101>

Figure 4:
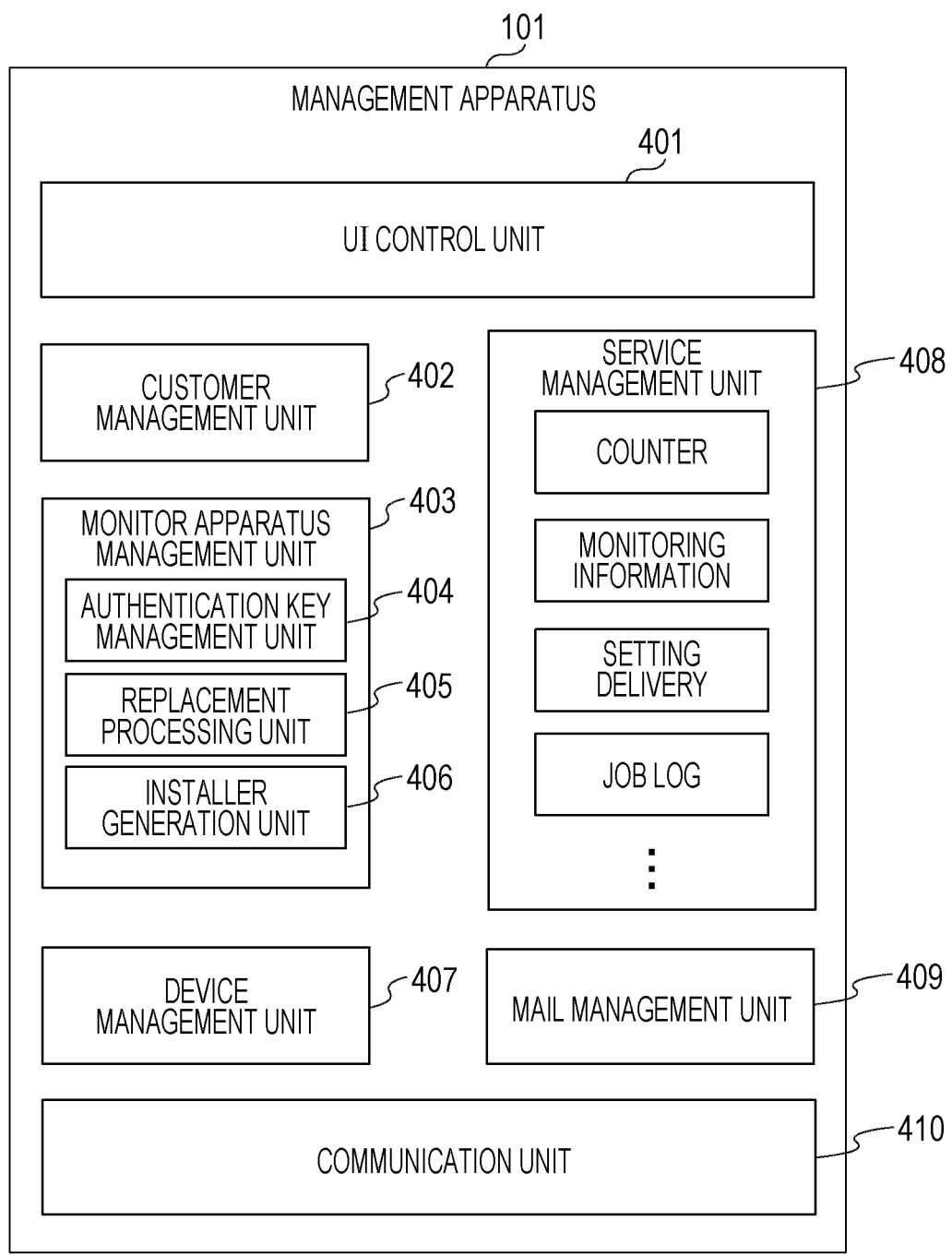
FIG. 4 is a software block diagram of the management apparatus.

FIG. 4 is a software block diagram of the management apparatus 101. The units illustrated with reference signs 401 to 410 in FIG. 4 are implemented by the CPU 201 of the management apparatus 101 reading the program from the HDD 212 or the like and executing the same.

A UI control unit 401 provides a graphical user interface (GUI) of the management apparatus 101. The GUI is formed as a Web application using Hyper Text Transfer Protocol (HTTP) that is usable from other client PCs. In this example, the management apparatus 101 is used as a Web application, but the GUI can be displayed on a display included in the management apparatus 101.

A customer management unit 402 manages customer information to be managed by the management apparatus 101. The customer management unit 402 associates a customer ID for uniquely identifying a customer with information related to the customer input by a person in charge with specific authority from a Web browser via the UI control unit 401, and stores and manages the same in a customer list in the database 102 as illustrated in FIG. 6 described below. The information related to the customer includes, for example, the customer's name, address, and service type provided to the customer.

A monitor apparatus management unit 403 manages the monitor apparatus 108 communicating with the management apparatus 101. The monitor apparatus management unit 403 associates the customer ID with information necessary for management of the monitor apparatus 108 as illustrated in FIG. 8, and stores and manages the same in a monitor apparatus list in the database 102. The information necessary for management of the monitor apparatus 108 includes, for example, a client ID for uniquely identifying the monitor apparatus 108 (monitor apparatus identification information), authentication key information for the monitor apparatus 108 to communicate with the management apparatus 101, ticket information for replacement of the monitor apparatus 108 with another PC, and others. The authentication key information includes, for example, authentication information such as an initial authentication key for use at the first communication between the monitor apparatus 108 and the management apparatus 101, an authentication key for use in communication after the initial registration, and a provisional authentication key for provisionally permitting communication at the time of replacement. The authentication information is issued, held, or deleted by the authentication key management unit 404.

When a person in charge with specific authority provides an instruction for generating a monitor apparatus on the web browser via the UI control unit 401, an authentication key management unit 404 issues the initial authentication key together with the client ID for uniquely identifying the monitor apparatus 108, and adds the same to the monitor apparatus list. The client ID and the initial authentication key are included in an installer package of a monitor apparatus module by an installer generation unit 406 described below. When receiving an initial registration request (a registration request including the client ID and the initial authentication key) from the monitor apparatus 108 via a communication unit 410, the monitor apparatus management unit 403 determines whether the request is from the monitor apparatus 108 registered with the management apparatus 101 by checking the monitor apparatus list with the use of the client ID and the initial authentication key included in the initial registration request. The monitor apparatus 108 transmits the initial registration request in the course of installing the monitor apparatus module.

The authentication key management unit 404 issues the authentication key when the authentication key management unit 404 receives the initial registration request via the communication unit 410 and searches the monitor apparatus list with the client ID and the initial authentication key included in the initial registration request and finds that no authentication key related to the searched registered client ID is yet issued. The monitor apparatus management unit 403 returns to the monitor apparatus 108 the authentication key together with the information indicating the success of the registration as a response to the initial registration request. After the issuance of the authentication key, the management apparatus 101 permits only communication from the monitor apparatus 108 with the use of the authentication key, and does not permit other communications.

The authentication key management unit 404 issues the provisional authentication key as a copy of authentication key when the authentication key management unit 404 receives the initial registration request via the communication unit 410 and finds that the initial registration request includes a ticket issued by a replacement processing unit 405 described below and the ticket is valid. In this case, the authentication key management unit 404 issues the authentication key again and the monitor apparatus management unit 403 returns to the monitor apparatus 108 the same together with information indicating the success of the replacement as a response to the initial registration request. When the provisional authentication key is issued, the management apparatus 101 permits receipt of only data of some of services described below (specific monitoring data). Whether the ticket is valid is determined by whether it is expired. In this example, the validity of the ticket is set by the period, but can be set by another method.

Figure 11:
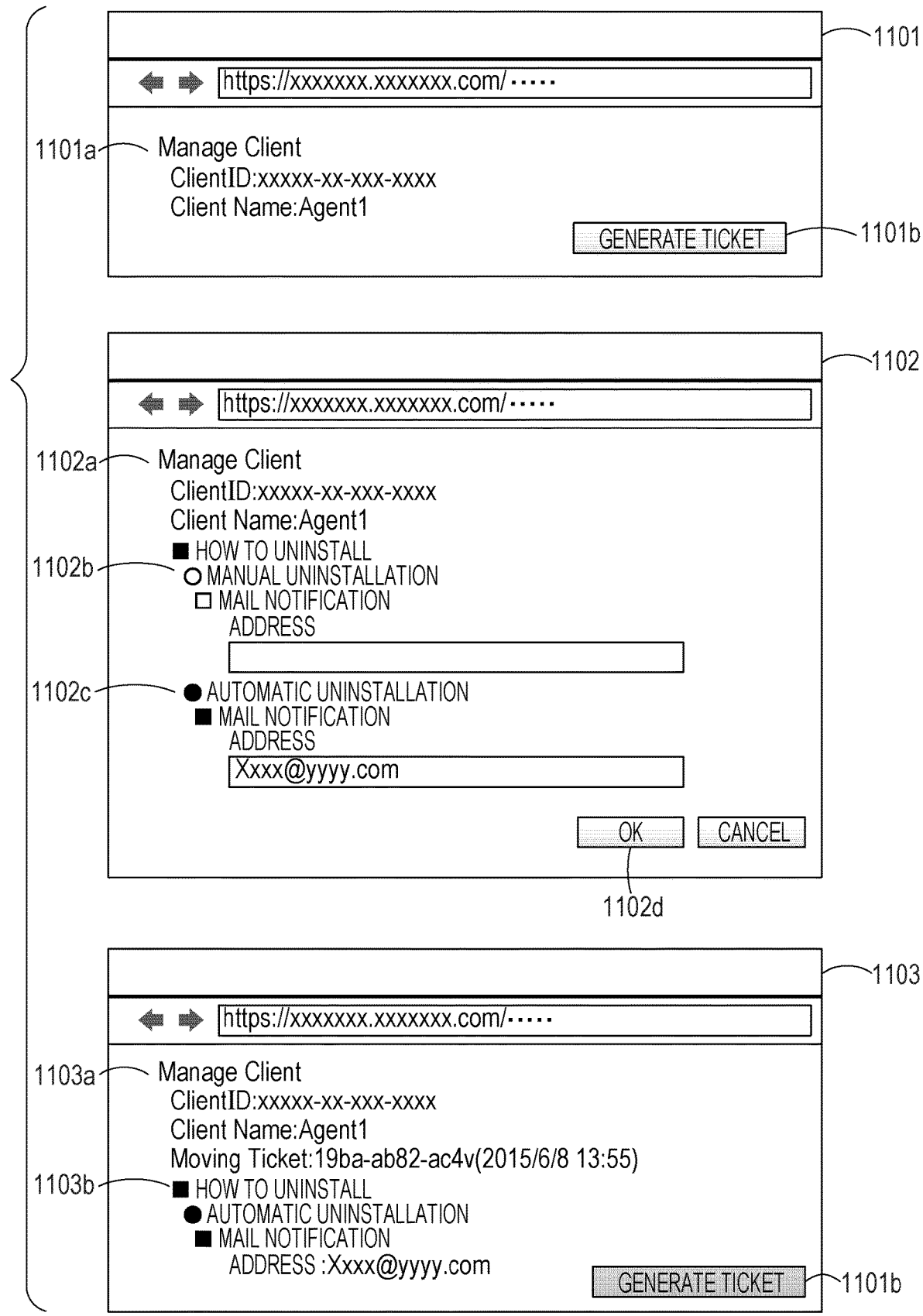
FIG. 11 is a diagram illustrating an example of screens for setting a process of replacing the monitor apparatus.

A replacement processing unit 405 manages tickets necessary for replacement of the PCs (that is, the monitor apparatuses 108) in which the monitor apparatus module is installed, and provides an instruction for uninstallation. When a process of issuing a ticket is executed by a person in charge with specific authority on a screen as illustrated in FIG. 11 described below on the web browser operating on the PC or the like, the replacement processing unit 405 issues a fixed-term ticket. At the time of issuance of the ticket, the person in charge selects and specifies whether to automatically uninstall the monitor apparatus module from the old monitor apparatus 108a. When automatic uninstallation is specified, the replacement processing unit 405 transmits an instruction for uninstallation to the monitor apparatus 108a via the communication unit 410.

An installer generation unit 406 generates an installer package of a monitor apparatus module. On the web browser, the person in charge with specific authority provides an instruction for generating the installer package and executing a download process. The installer package includes a program (monitor apparatus module) for enabling a computer to act as a UI control unit 501, a device management unit 502, a registration processing unit 503, an uninstallation processing unit 504, a service management unit 505, and a communication unit 506 of the monitor apparatus 108 illustrated in FIG. 5 described below. The installer package also includes information such as the customer ID, the client ID, and the initial authentication key. The generated installer package is stored in the database 102. After the issuance of the client ID by the monitor apparatus management unit 403, the installer package of the monitor apparatus module can be generated and its downloading can be instructed at any time on the web browser via the UI control unit 401 by the person in charge with specific authority.

A device management unit 407 manages information necessary for management of the devices 107. The device management unit 407 associates device IDs for uniquely identifying the devices 107 with configuration information such as IP addresses, and stores and manages the same in a device list in the database 102 as illustrated in FIG. 7 described below. The information to be stored in the device list can be registered on the web browser via the UI control unit 401 or can be acquired by the monitor apparatus 108 from the device 107 and transmitted to the management apparatus 101 for registration. In the device list, the monitor apparatuses 108 (client IDs) are managed in association with individual services to be provided.

A service management unit 408 manages the services provided by the management apparatus 101. In the example of FIG. 4, the service management unit 408 manages a counter service, a monitoring information service, a setting delivery service, a job log service, and others. In the counter service, counter information on the device 107 is managed. In the monitoring information service, status information such as error is managed. In the setting delivery service, set value information on the devices 107 is managed. In the job log service, job log information on the devices 107 is managed. In the example, the services are segmented by the kind of device information acquired from the devices 107, such as the counter service, the job log service, the monitoring information service, and the setting delivery service. The management method of the services and the data treated in the services can be set arbitrarily. In each of the services, the data is acquired and delivered from the monitor apparatus 108 via the communication unit 410, and the acquired data is stored in the database 102, and then is processed and provided. In addition, the service management unit 408 stores the last date and time where the data was received in each of the services, in the service-based data management list for each device 107, and manages the same in the database 102 as illustrated in FIG. 9 described below.

A mail management unit 409 transmits mail via the UI control unit 401 according to the schedule set on the web browser.

As for communications from the monitor apparatus 108 to the management apparatus 101, after the success of the initial registration, only the communication with the use of the issued authentication key is permitted, and the other communications are not permitted. However, when a provisional authentication key is issued, communication is permitted for limited ones of the services. This is intended to, at the replacement of the PC in which the monitor apparatus module is installed, prevent omission (collection failure) of data held by the old monitor apparatus 108a before the replacement. In the example, only the communications of data for the job log service and the setting delivery service are permitted, but the present embodiment is not limited to this.

<Diagram Illustrating a Software Configuration of the Monitor Apparatus 108>

Figure 5:
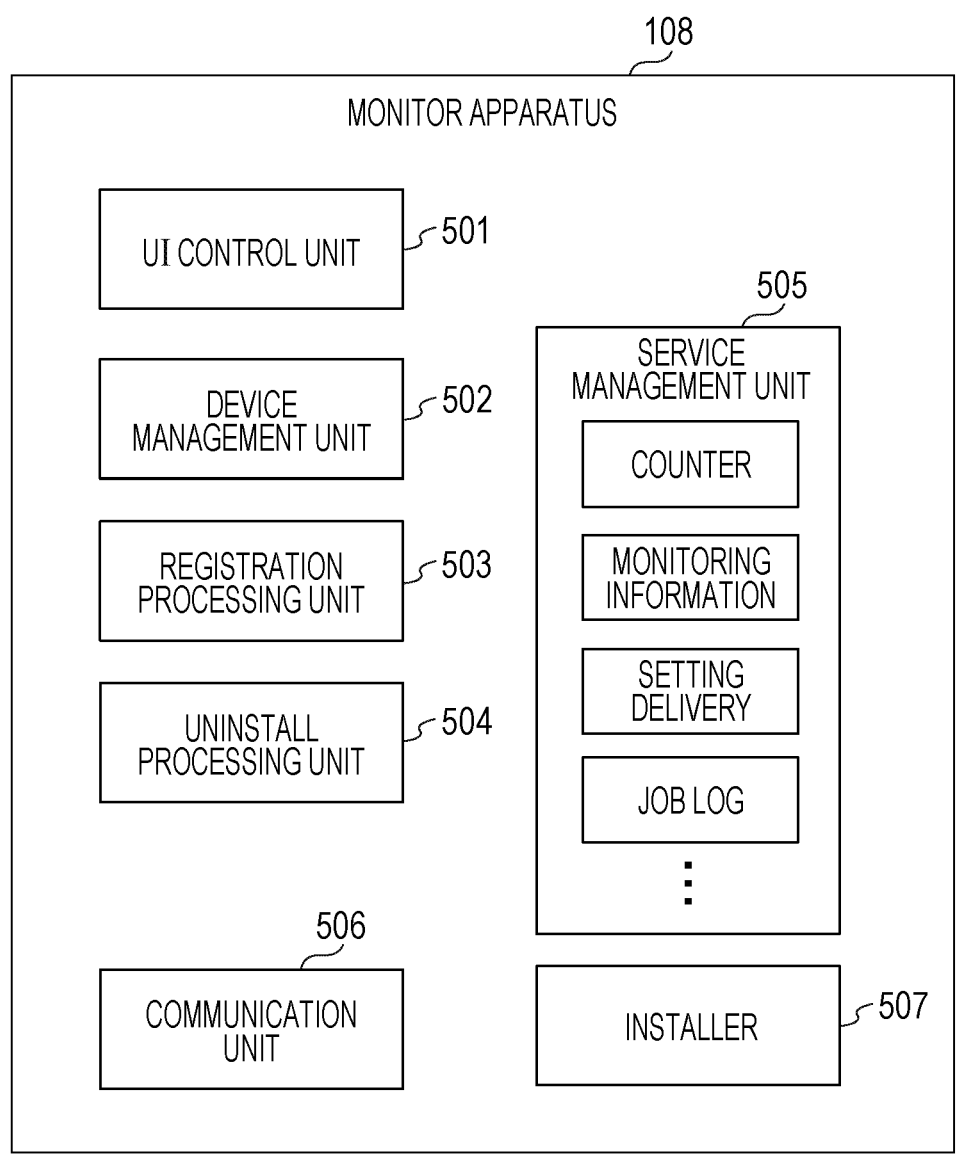
FIG. 5 is a software block diagram of the monitor apparatus.

FIG. 5 is a software block diagram of the monitor apparatus 108.

A UI control unit 501 provides GUI of the monitor apparatus 108. The GUI is formed as a Web application with HTTP that is usable from other client PCs. Alternatively, the GUI can be displayed on a display included in the monitor apparatus 108.

A device management unit 502 stores information on the devices 107 managed by the monitor apparatus 108 in a list based on services (service-based device list) as illustrated in FIG. 10 described below, and manages the same in the database 110. The device management unit 502 acquires the information in the service-based device list from the management apparatus 101 via the communication unit 506. The device management unit 502 acquires detail information (model name, serial number, status, MAC address, and others) from the devices 107 via the communication unit 506, and transmits the same to the management apparatus 101 via the communication unit 506.

A registration processing unit 503 performs an initial registration process of the monitor apparatus 108 with the management apparatus 101 via the communication unit 506. The registration processing unit 503 performs the initial registration process in the middle of the installation process of the monitor apparatus module. In the initial registration process, the registration processing unit 503 transmits an initial registration request using the client ID and the initial authentication key included in the installer package (registration request including the client ID and the initial authentication key) to the management apparatus 101 via the communication unit 506. The installer package can be downloaded by a person in charge with specific authority from the management apparatus 101 on a web browser. The installer package includes a program enabling a computer to act as the UI control unit 501, the device management unit 502, the registration processing unit 503, the uninstallation processing unit 504, the service management unit 505, and the communication unit 506, and is placed in a specific folder of the monitor apparatus 108 in an executable manner in the installation process. When the initial registration process succeeds, the management apparatus 101 returns an authentication key as a response to the initial registration request. Subsequently, the monitor apparatus 108 communicates with the management apparatus 101 by a signature using the authentication key.

Figure 12:
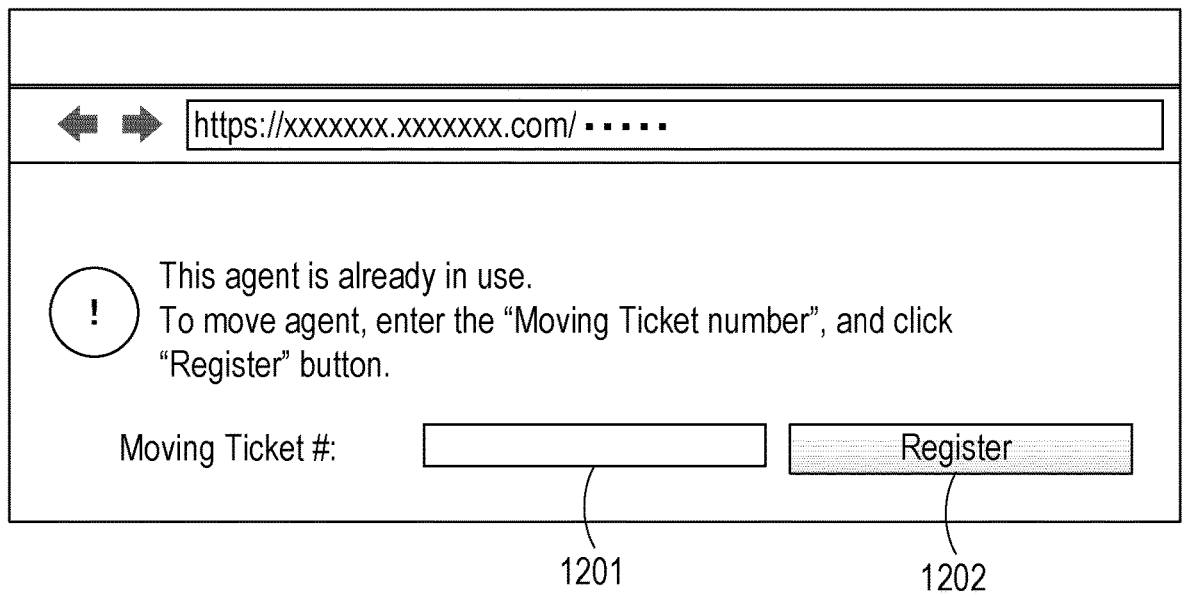
FIG. 12 is a diagram illustrating an example of ticket input screen.

When the initial registration process fails, the registration processing unit 503 displays a ticket input screen as illustrated in FIG. 12 described below on the web browser via the UI control unit 501. When the person in charge of installation inputs a ticket from the ticket input screen and presses Register button (1202 illustrated in FIG. 12), the registration processing unit 503 transmits the initial registration request (with the ticket added) again to the management apparatus 101 via the communication unit 506. The ticket is issued by a person in charge with specific authority providing an instruction for executing the replacement process from the web browser on a screen for setting the replacement process of the management apparatus 101 (FIG. 11) described below. When the initial registration process with the ticket added succeeds, the management apparatus 101 returns the information indicating the success of the replacement and the authentication key as a response to the initial registration request. The ticket can be issued before or after the failure of the initial registration process.

An uninstallation processing unit 504 performs an uninstallation process of the monitor apparatus module. The uninstallation processing unit 504 executes the uninstallation process with an instruction for uninstall from the management apparatus 101 or manual execution by the person in charge as a trigger. When receiving the instruction for uninstall from the management apparatus 101, the uninstallation processing unit 504 transmits the device information stored in the database 110 corresponding to some of the services (specific monitoring data) to the management apparatus 101, and executes the uninstallation after completion of the transmission. In the example, as the device information corresponding to some of the services described above, the data for the job log service and the setting delivery service is transmitted as an example. However, the present embodiment is not limited to this.

A service management unit 505 manages the services provided by the management apparatus 101. The services have the role of acquiring the device information necessary for the service provided by the management apparatus 101 from the devices 107 via the communication unit 506 and delivering the same, and transmitting the same to the management apparatus 101. The modules of the services are downloaded from the management apparatus 101. The modules to be downloaded are modules corresponding to the services in a service-based data management table acquired from the management apparatus 101 after completion of the initial registration process.

The schedules for acquiring the device information from the devices 107 are defined in the services. In the services, the device information is acquired from the devices 107 and stored in the database 110 according to the schedules. The device information acquired from the devices 107 and stored in the database 110 in the services is transmitted to the management apparatus 101 via the communication unit 506 in the services according to the data transmission schedules acquired from the management apparatus 101 in the services. The service management unit 505 deletes the device information previously transmitted to the management apparatus 101 from the database 110.

An installer 507 is a program provided by the OS managing the installation and uninstallation of programs by the monitor apparatus 108.

<Diagram Illustrating an Example of a Customer List in the Management Apparatus 101>

FIG. 6 is a diagram illustrating an example of customer list registered in the management apparatus 101. The management list is managed by the customer management unit 402.

Under customer ID 602, IDs for uniquely identifying customers are stored. Under customer name 602, display names of the customers are stored. Under Address 603, address information of the customers is stored. Under service type 604, IDs indicative of services provided by the management apparatus 101 are stored. In the example, the customer list includes customer names and addresses. However, the customer list may include any other information as far as it relates to customers. In addition, some kind of customer information can be managed in another list.

<Diagram Illustrating an Example of a Device List in the Management Apparatus 101>

FIG. 7 is a diagram illustrating an example of list of the devices 107 (device list) registered in the management apparatus 101. The device list is managed by the device management unit 407.

Under customer ID 701, IDs for uniquely identifying customers are stored. Under device ID 702, IDs for uniquely identifying the devices 107 are stored. Under product name 703, the product names of the devices 107 are stored. Under IP addresses 704, the IP addresses of the devices 107 are stored. Under MAC addresses 705, the MAC addresses of the devices 107 are stored. Under serial numbers 706, the serial numbers of the devices 107 are stored. Under service type 707, IDs of the services provided by the management apparatus 101 are stored. In the example, the service types are managed by IDs, but the present embodiment is not limited to this. Under client ID 708, the IDs for uniquely identifying the monitor apparatuses 108 are stored. The data for the services set by service types with the client IDs are associated with the IDs of the monitor apparatuses 108 acquired from the devices 107.

In the example, the device list includes the service types and the client IDs. However, these items can be managed in another list. Also in the example, the IP addresses, the MAC addresses, and others are specified. However, the device list can include any other information as far as it relates to the devices 107.

<Diagram Illustrating an Example of a Monitor Apparatus List in the Management Apparatus 101>

FIG. 8 is a diagram illustrating an example of monitor apparatus list in the management apparatus 101. The monitor apparatus list is managed by the monitor apparatus management unit 403.

Under customer ID 801, IDs for uniquely identifying customers are stored. Under client ID 802, IDs for uniquely identifying the monitor apparatuses 108 are stored. Under initial authentication key 803, authentication keys for use in the initial registration of the monitor apparatuses 108 with the management apparatus 101 are stored. The initial authentication keys 803 are uniquely associated with the client IDs 802.

Under authentication key 804, authentication keys to be used by the monitor apparatuses 108 having succeeded the initial registration to communicate with the management apparatus 101 are stored. The authentication key 804 is issued when, upon receipt of an initial registration request from the monitor apparatus 108 by the management apparatus 101, the authentication key management unit 404 searches the monitor apparatus list for the client ID and the initial authentication key included in the initial registration request and finds that the monitor apparatus 108 is a previously registered monitor apparatus and no authentication key is yet issued for the monitor apparatus 108. In addition, the authentication key 804 is issued again when the initial registration request includes a ticket and the ticket is valid.

Under authentication key issuance date and time 805, the dates and times when the authentication key management unit 404 issued the authentication keys 804 are stored.

Under provisional authentication key 806, authentication keys for provisionally permitting communication at the time of replacement of the monitor apparatuses 108 are stored. The provisional authentication key 806 is issued as a copy of the authentication key 804 when the initial registration request includes a ticket and the ticket is valid. Under provisional authentication key issuance date and time 807, the dates and times when the authentication key management unit 404 issued the provisional authentication keys 806 are stored.

Under ticket 808, tickets for permitting replacement of the monitor apparatuses 108 are stored.

Under ticket expiration date and time 809, the expiration dates and times of the tickets are stored.

The monitor apparatus list also stores information on uninstallation methods designated at the time of instruction for ticket generation together with the tickets 808 and the ticket expiration dates and times 809, although not illustrated in FIG. 8. The information on the uninstallation methods includes information for specifying manual uninstall or automatic uninstall, information for specifying the presence or absence of mail notification, information for specifying a notification destination address, and others. FIG. 11 illustrates the details of the foregoing information.

<Diagram Illustrating an Example of a Service-Based Data Management List in the Management Apparatus 101>

FIG. 9 is a diagram illustrating an example of device-based service provision status list (service-based data management list) registered in the management apparatus 101. The service-based data management list is managed by the service management unit 408.

Under customer ID 901, IDs for uniquely identifying customers are stored. Under device ID 902, IDs for uniquely identifying the devices 107 are stored. Under service type 903, IDs indicative of the services provided by the management apparatus 101 are stored. In the example, the service types are managed by IDs, but the present embodiment is not limited to this.

Under last reception date and time 904, the final dates and times when data was received in the services are stored.

<Diagram Illustrating an Example of a Service-Based Device Management List in the Monitor Apparatus 108>

FIG. 10 is a diagram illustrating an example of service-based device list (service-based device management list) registered in the monitor apparatus 108. The service-based device management list is managed by the device management unit 502.

Under device ID 1001, IDs for uniquely identifying the devices 107 are stored. Under IP addresses 1002, the IP addresses of the devices 107 are stored. Under MAC addresses 1003, the MAC addresses of the devices 107 are stored. In the example, the information constituting the service-based device management list includes the IP addresses, the MAC addresses, and others, but can include any other information related to the devices 107.

<Diagram Illustrating an Example of Setting Screens for a Replacement Process of a PC in which the Monitor Apparatus Module Provided by the Management Apparatus 101 is Installed>

FIG. 11 is a diagram illustrating an example of screens for setting a replacement process of a PC into which the monitor apparatus module provided by the management apparatus 101 is installed. The screens for setting the replacement process are displayed on a web browser operating on a PC via the UI control unit 401 by a person in charge with specific authority using a Web application operating on the management apparatus 101. The apparatus displaying the screens can be any apparatus as far as it enables use of the Web application operating on the management apparatus 101. For example, the apparatus displaying the screens can be a PC operating as the pre-replacement old monitor apparatus 108a, or a PC operating as a new monitor apparatus 108b after replacement, or any other PC. The person in charge with specific authority can use the Web application installed into the management apparatus 101 from the web browser on the apparatus as described above, and specify the information for identifying the client ID of the monitor apparatus to be replaced to receive the screens for setting the replacement process as illustrated in FIG. 11 from the management apparatus 101 and display the same. When the Web application is used from the PC operating as the pre-replacement old monitor apparatus 108a, the client ID of the monitor apparatus 108a can be automatically specified as the client ID of the monitor apparatus to be replaced.

The screen 1101 corresponds to the initial window for setting the replacement process on the monitor apparatus management screen. The screen 1101 is provided by the UI control unit 401 and displayed on the web browser by the person in charge with specific authority accessing the monitor apparatus management screen from the web browser operating on the PC or the like and specifying the client ID of the monitor apparatus to be replaced.

The screen 1101 displays the client ID and the client name as information indicative of the target monitor apparatus (1101a). When a ticket generation button 1101b is pressed on the screen 1101, a screen 1102 is displayed (transition takes place to the screen 1102 under control of the UI control unit 401).

The screen 1102 is a screen for selecting the method of uninstalling the monitor apparatus module from the old PC in which the monitor apparatus module is currently installed. The screen 1102 displays the client ID and the client name as information indicative of the target monitor apparatus (1102a). In addition, as an uninstallation method, manual uninstallation (1102b) or automatic uninstallation (1102c) can be selected and specified. In 1102b or 1102c, mail notification for notifying the uninstallation timing to the user can be specified. When the mail notification is selected, the mail address as a notification destination can be input. The uninstallation timing means the timing for uninstalling the monitor apparatus module from the pre-replacement old monitor apparatus 108 or the timing for automatic uninstallation. When the foregoing information is input and an OK button 1102d is pressed, the instruction for ticket generation is transmitted to the management apparatus 101. In response to this, the replacement processing unit 405 in the management apparatus 101 generates a ticket related to the client ID and displays a screen 1103 (transition takes place to the screen 1103 under control of the UI control unit 401). The press of the OK button 1102d corresponds to providing the instruction for replacing the information processing apparatus in which the monitor apparatus module is installed (that is, the information processing apparatus operating as the monitor apparatus 108).

The screen 1103 displays the generated ticket and the expiration date and time of the ticket as well as the client ID and the client name as information indicative of the target monitor apparatus (1103*a*). The screen 1103 also displays the set uninstallation method, the presence or absence of the mail notification, the notification destination address (1103*b*). The screen 1103 also controls the ticket generation button 1101*b* in a deactivated state (displayed in gray in the drawing) before the expiration date and time. Accordingly, no ticket is recreated before the expiration date and time. The information on the generated ticket, the expiration date and time of the ticket, the set uninstallation method, the presence or absence of the mail notification, and the notification destination address is managed in the foregoing monitor apparatus list in the device management system 100.

<Diagram Illustrating an Example of Ticket Input Screen in the Monitor Apparatus 108*b*>

FIG. 12 is a diagram illustrating an example of ticket input screen that is displayed when the initial registration process has failed and is provided by the monitor apparatus 108*b*. The ticket input screen illustrated in FIG. 12 is displayed on the web browser via the UI control unit 501 by the post-replacement new monitor apparatus 108*b* of which the initial registration has failed, activating the web browser and using from the web browser a Web application operating on the monitor apparatus 108*b*.

The issuance of the ticket can be specified by a person in charge with specific authority from the screen for setting the replacement process (FIG. 11). When the person in charge with specific authority inputs the ticket issued as described above into a ticket input field 1201 and presses Register button 1202, the registration processing unit 503 transmits the initial registration request with the ticket added to the management apparatus 101.

In this example, the ticket input screen illustrated in FIG. 12 is provided from the Web application in the monitor apparatus 108*b*. However, the ticket input screen does not necessarily need to be provided from the Web application. The ticket input screen can be configured in any manner that enables the input of a ticket when the initial registration process of the monitor apparatus 108*b* fails. The ticket input screen illustrated in FIG. 12 can be provided from the management apparatus 101 when the initial registration process of the monitor apparatus 108*b* fails.

The ticket input screen has been described above as a screen provided from the Web application operating on the monitor apparatus 108. However, the ticket input screen can be a general input dialogue.

<Flowchart of the Installation Process by the Monitor Apparatus 108>

Figure 13:
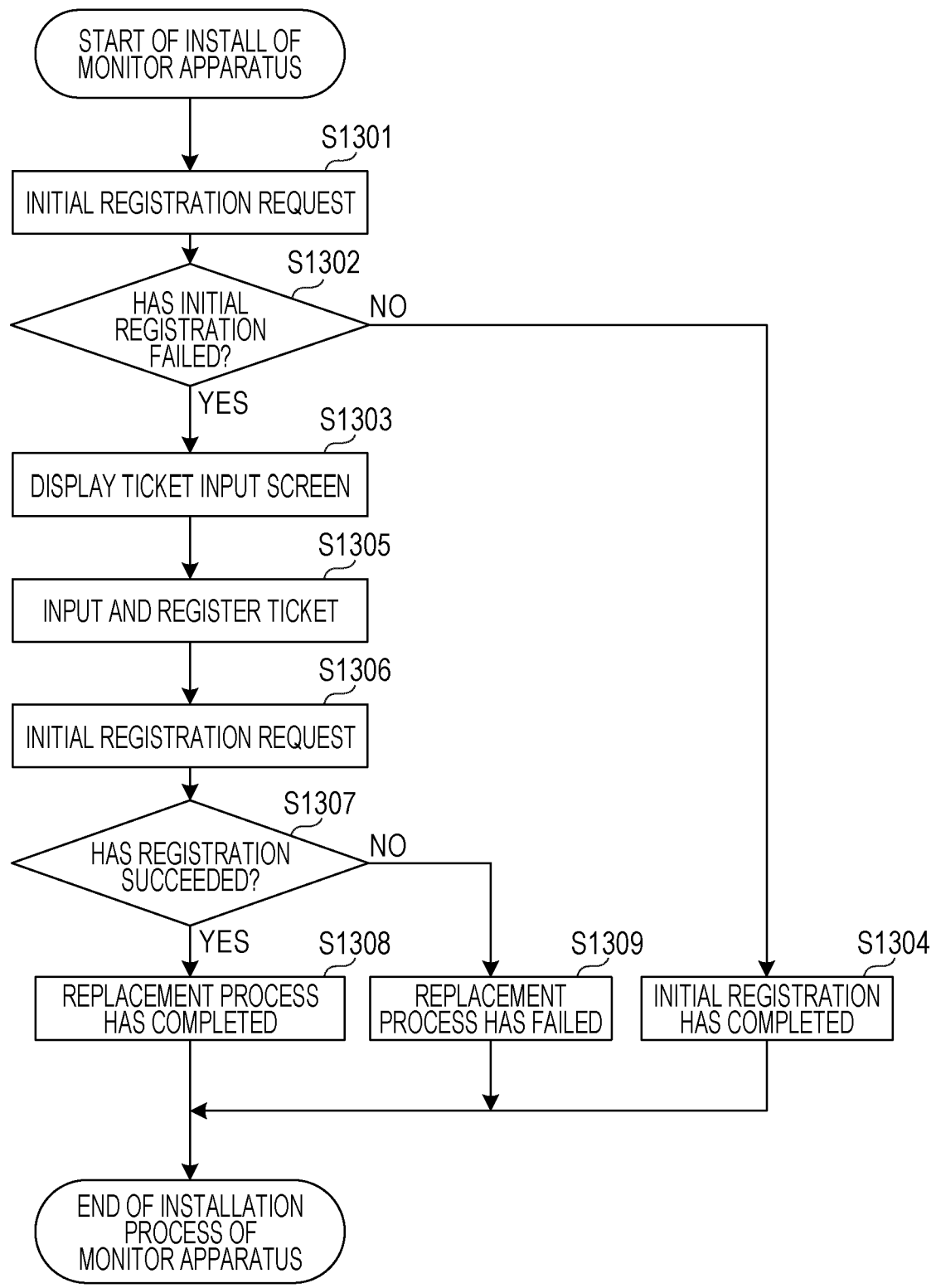
FIG. 13 is a flowchart of an installation process in the monitor apparatus.

FIG. 13 is a flowchart of an installation process in the monitor apparatus 108 according to the example. The steps in the flowchart are carried out by the CPU 201 provided in the monitor apparatus 108 reading the control program of the present invention stored in a non-volatile memory such as the ROM 202 or the HDD 212 and executing the same.

When the initial registration process is started in the installation process of the monitor apparatus module, the registration processing unit 503 starts the process of the flowchart.

First, at step S1301, the registration processing unit 503 transmits the initial registration request to the management apparatus 101 via the communication unit 506. The initial registration request includes the client ID and the initial authentication key included in the installer package. Then, the registration processing unit 503 receives a response to the initial registration request made at S1301 from the management apparatus 101 via the communication unit 506.

Next, at S1302, the registration processing unit 503 determines whether the initial registration has failed based on the response to the initial registration request made at S1301. When determining that the initial registration has not failed (succeeded) (No at S1302), the registration processing unit 503 moves the process to S1304. At S1304, the registration processing unit 503 displays an indication that the initial registration of the monitor apparatus 108 has completed via the UI control unit 501, and ends the process of the flowchart.

When determining that the initial registration has failed (Yes at S1302), the registration processing unit 503 moves the process to S1303.

At S1303, the registration processing unit 503 displays a ticket input screen via the UI control unit 501 as illustrated in FIG. 12.

Next, at S1305, the registration processing unit 503 accepts the input of the ticket via the UI control unit 501 and the press of the Register button 1202. When the ticket is input via the UI control unit 501 and the Register button 1202 is pressed, the registration processing unit 503 moves the process to S1306. The ticket can be generated before or after the failure of the initial registration.

At S1306, the registration processing unit 503 adds the ticket information to the initial registration request transmitted at S1301, and retransmits the same to the management apparatus 101 via the communication unit 506. After that, the registration processing unit 503 receives a response to the initial registration request retransmitted at S1306 from the management apparatus 101 via the communication unit 506.

Next, at S1307, the registration processing unit 503 determines whether the registration has succeeded based on the response to the request made at S1306. When determining that the registration has succeeded (Yes at S1307), the registration processing unit 503 moves the process to S1308.

At S1308, the registration processing unit 503 displays an indication that the replacement of the PC operating as a monitor apparatus has completed via the UI control unit 501, and ends the process of the flowchart.

When determining that the registration has failed (No at S1307), the registration processing unit 503 moves the process to S1309.

At S1309, the registration processing unit 503 displays an indication that the replacement of the PC operating as a monitor apparatus has failed via the UI control unit 501, and ends the process of the flowchart.

<Flowchart of a Registration Process of the Monitor Apparatus 108 in the Management Apparatus 101>

Figure 14:
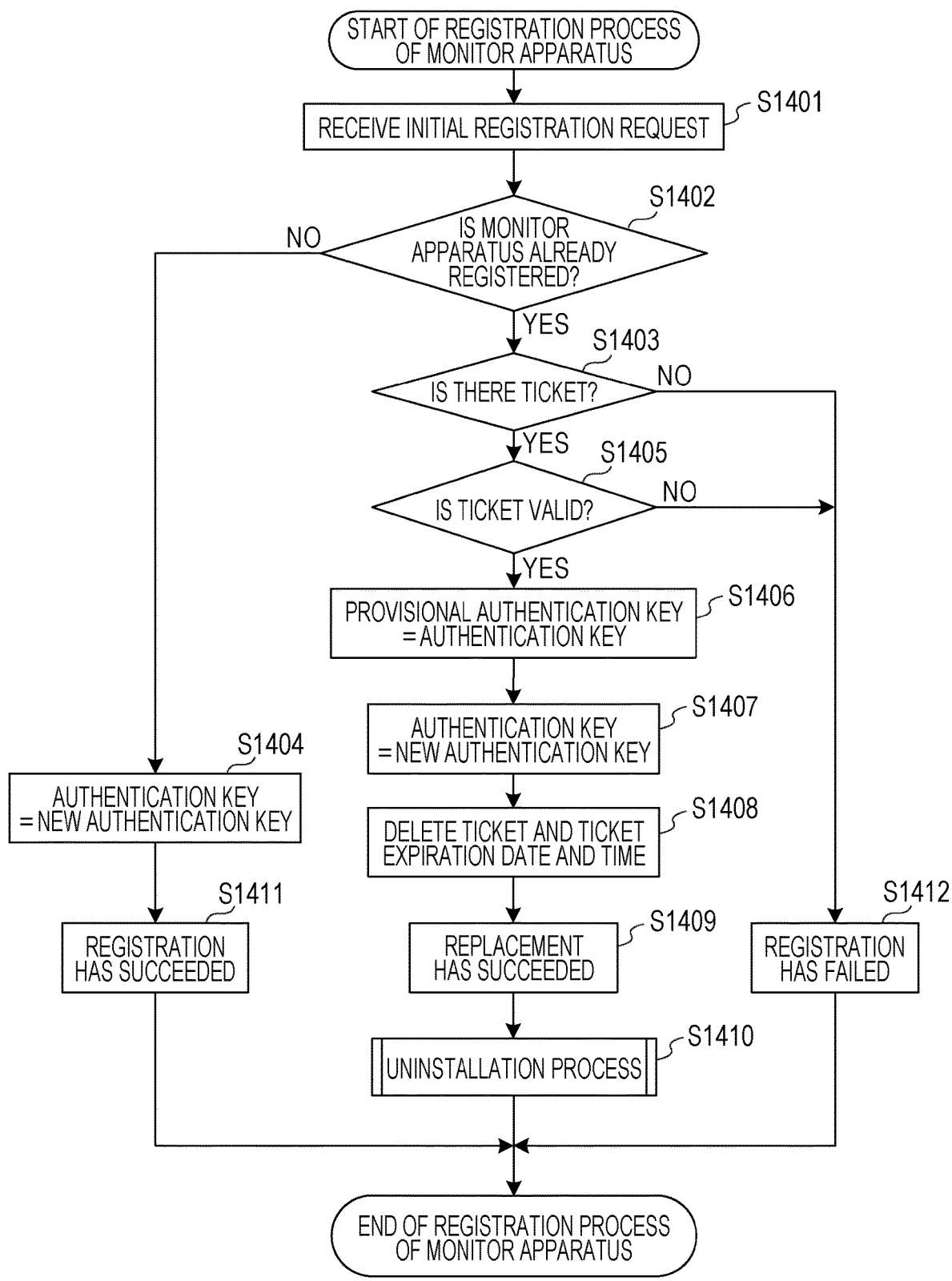
FIG. 14 is a flowchart of a monitor apparatus registration process in the management apparatus.

FIG. 14 is a flowchart of a monitor apparatus registration process in the management apparatus 101 according to the example. The steps in the flowchart are carried out by the CPU 201 provided in the management apparatus 101 reading the control program of the present invention stored in a non-volatile memory such as the ROM 202 or the HDD 212 and executing the same.

At step S1401, when the monitor apparatus management unit 403 receives an initial registration request from the monitor apparatus 108 via the communication unit 410, the authentication key management unit 404 executes S1402. At S1401, both the initial registration request transmitted at S1301 described in FIG. 13 and the initial registration request resent at S1306 can be received.

At S1402, the authentication key management unit 404 searches the monitor apparatus list (FIG. 8) by the client ID and the initial authentication key included in the initial registration request received at S1401 to determine whether the monitor apparatus as a request source is a previously registered monitor apparatus. Whether the monitor apparatus is a previously registered monitor apparatus is determined based on whether the authentication key 804 related to the client ID included in the initial registration request has been issued.

When not determining that the monitor apparatus is a previously registered monitor apparatus (the authentication key 804 has not been issued) (No at S1402), the authentication key management unit 404 moves the process to S1404.

At S1404, the authentication key management unit 404 issues a new authentication key 804 related to the client ID included in the initial registration request. At S1411, the monitor apparatus management unit 403 returns to the monitor apparatus 108 information indicating the success of the registration as a response to the initial registration request received at S1401. At this time, the monitor apparatus management unit 403 also returns the authentication key 804 issued at S1404. After execution of S1411, the process of the flowchart ends.

Meanwhile, when determining at S1402 that the monitor apparatus is a previously registered monitor apparatus (the authentication key 804 has been already issued) (Yes at S1402), the authentication key management unit 404 executes S1403.

At S1403, the authentication key management unit 404 determines whether the initial registration request received at S1401 includes a ticket. When the authentication key management unit 404 does not determine that the initial registration request includes a ticket (No at S1403), the monitor apparatus management unit 403 executes S1412.

At S1412, the monitor apparatus management unit 403 returns to the monitor apparatus 108 information indicating the failure of the registration as a response to the initial registration request received at S1401. After S1412, the process of the flowchart ends.

When determining at S1403 that the initial registration request received at S1401 includes a ticket (Yes at S1403), the authentication key management unit 404 executes S1405.

At S1405, the authentication key management unit 404 determines whether the ticket included in the initial registration request is valid. The validity of the ticket is determined based on the ticket 808 and the ticket expiration date and time 809 in the monitor apparatus list (FIG. 8). For example, the ticket is determined to be valid when the ticket information included in the initial registration request matches the ticket 808 related to the client ID included in the initial registration request and the current date and time has not passed the ticket expiration date and time 809, and the ticket is determined to be invalid in other situations. In the example, the validity is determined by the expiration date of the ticket, but can be determined by another method.

When the authentication key management unit 404 does not determine that the ticket included in the initial registration request is valid (No at S1405), the monitor apparatus management unit 403 executes S1412. S1412 and the subsequent steps are as described above and are not described herein.

When determining that the ticket is valid (Yes at S1405), the authentication key management unit 404 executes S1406.

At S1406, the authentication key management unit 404 copies the authentication key 804 set in relation to the client ID included in the initial registration request to the provisional authentication key 806. At S1407, the authentication key management unit 404 reissues the authentication key 804. That is, the provisional authentication key 806 is identical to the authentication key 804 before the reissuance.

At S1408, the replacement processing unit 405 deletes the ticket 808 and the ticket expiration date and time 809.

Next, at S1409, the monitor apparatus management unit 403 returns to the monitor apparatus 108 information indicating the success of the replacement as a response to the initial registration request received at S1401. At this time, the monitor apparatus management unit 403 also returns the authentication key 804 reissued at S1407.

Next, at S1410, the monitor apparatus management unit 403 executes an uninstallation process (the details are provided in FIG. 15 described below). After S1410, the process of the flowchart ends.

In the example, the authentication key 804 is returned together with a response to the initial registration request, but it can be transmitted to the monitor apparatus 108 by another method.

<Flowchart of the Uninstallation Process of the Monitor Apparatus in the Management Apparatus 101>

Figure 15:
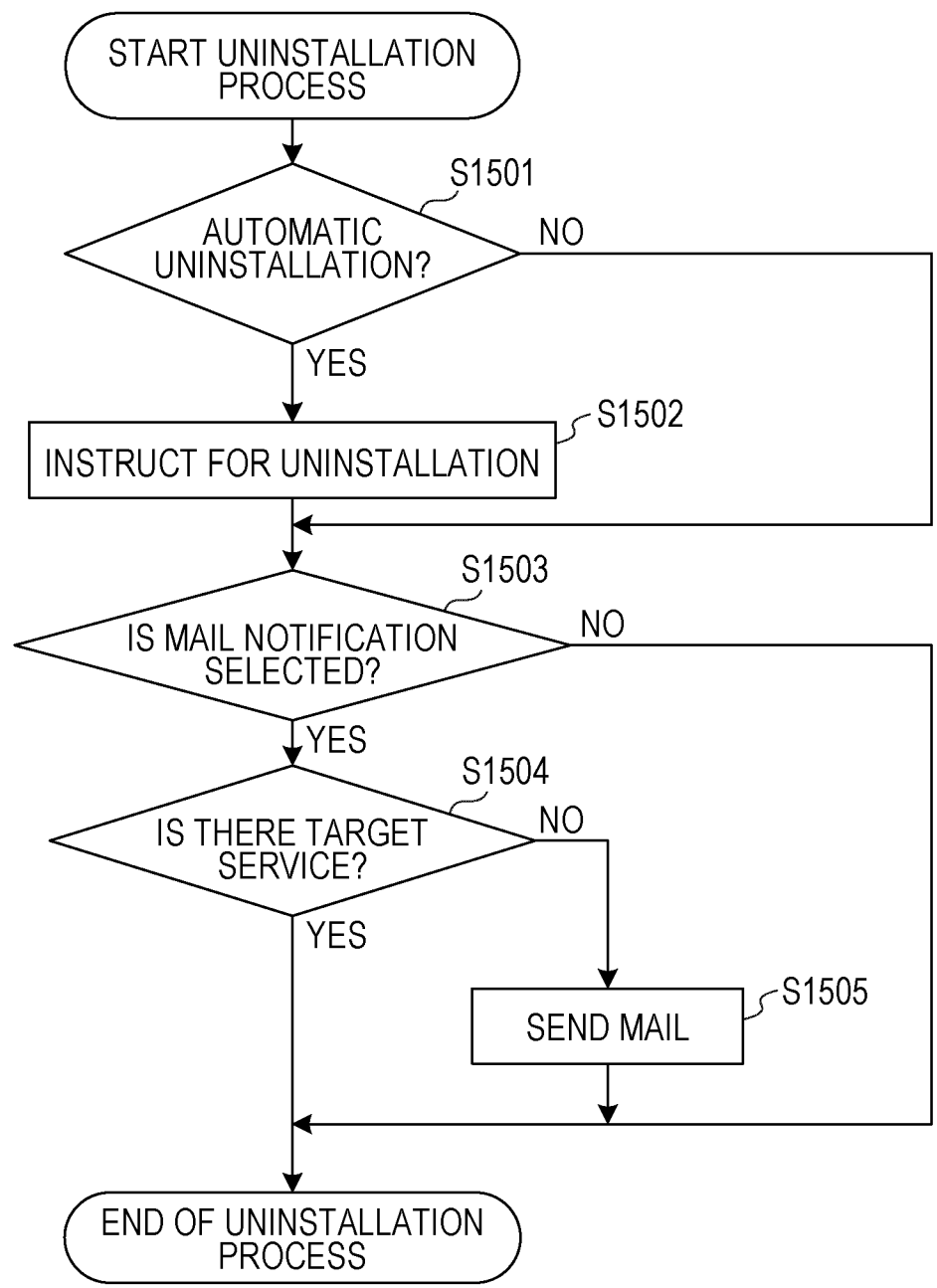
FIG. 15 is a flowchart of an uninstallation process in the management apparatus.

FIG. 15 is a flowchart of an uninstallation process of the monitor apparatus in the management apparatus 101 (the uninstallation process at S1410 described in FIG. 14). The steps in the flowchart are carried out by the CPU 201 provided in the management apparatus 101 reading the control program of the present invention stored in a non-volatile memory such as the ROM 202 or the HDD 212 and executing the same.

At step S1501, the replacement processing unit 405 determines whether automatic installation is specified in the replacement process based on information on the uninstallation method stored in the monitor apparatus list (not illustrated). The automatic uninstallation is specified on the screen illustrated in FIG. 11. When determining that the automatic installation is specified (Yes at S1501), the replacement processing unit 405 moves the process to S1502.

At S1502, the replacement processing unit 405 transmits an instruction for uninstallation to the monitor apparatus 108 via the communication unit 410. The replacement processing unit 405 stores the instruction for uninstallation in advance in an event queue and transmits the instruction as a response to an inquiry from the monitor apparatus 108. In the example, as a response to a polling from the management apparatus 101, the management apparatus 101 issues the instruction to the monitor apparatus 108. Alternatively, the management apparatus 101 can issue the instruction directly to the monitor apparatus 108. After S1502, the replacement processing unit 405 moves the process to S1503.

At S1501, when not determining that the automatic uninstallation is specified (manual uninstallation is specified) (No at S1501), the replacement processing unit 405 moves the process to S1503.

At S1503, the replacement processing unit 405 determines whether the mail notification is specified in the replacement process based on information on the uninstallation method stored in the monitor apparatus list (not illustrated). The mail notification is specified on the screen illustrated in FIG. 11. When not determining that the mail notification is specified (No at S1503), the replacement processing unit 405 ends the process of the flowchart.

When determining that the mail notification is specified (Yes at S1503), the replacement processing unit 405 moves the process to S1504.

At S1504, the replacement processing unit 405 refers to the device list as illustrated in FIG. 7 to determine whether there is any target service in which data from the pre-replacement monitor apparatus 108 is to be received, out of the service types associated with the replacement monitor apparatus. In the example, the job log service and the setting delivery service are assumed as examples of services associated with the replacement monitor apparatus, but the present embodiment is not limited to this.

When determining that there is some target service in which data from the pre-replacement monitor apparatus 108 is to be received, out of the service types associated with the replacement monitor apparatus (Yes at S1504), the replacement processing unit 405 ends the process of the flowchart.

When not determining that there is any target service in which data from the pre-replacement monitor apparatus 108 is to be received, out of the service types associated with the replacement monitor apparatus (No at S1504), the replacement processing unit 405 moves the process to S1505.

At S1505, the mail management unit 409 transmits mail for notifying the uninstallation timing to the mail address set in the information on the uninstallation method (not illustrated) stored in the monitor apparatus list, and ends the process of the flowchart. The uninstallation timing is the timing when the monitor apparatus module can be uninstalled from the post-replacement old monitor apparatus 108a, or the timing for automatic installation.

<Flowchart of the Uninstallation Process in the Monitor Apparatus 108>

Figure 16:
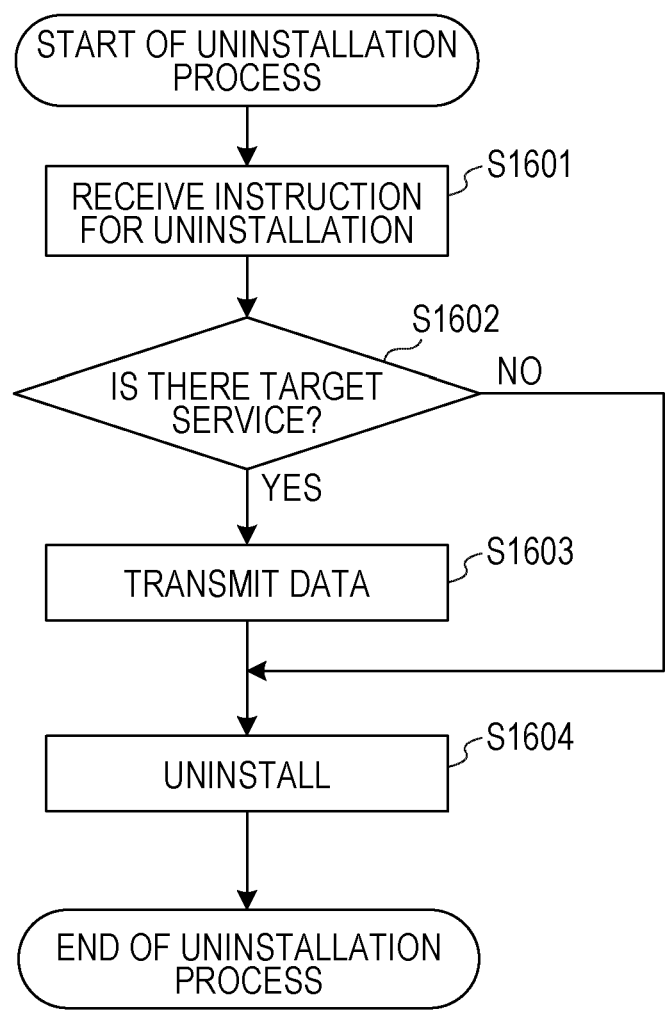
FIG. 16 is a flowchart of an uninstallation process in the monitor apparatus.

FIG. 16 is a flowchart of an uninstallation process of the monitor apparatus 108 according to the embodiment. The steps in the flowchart are carried out by the CPU 201 provided in the monitor apparatus 108 reading the control program of the present invention stored in a non-volatile memory such as the ROM 202 or the HDD 212 and executing the same.

At step S1601, when the uninstallation processing unit 504 receives an instruction for uninstallation from the management apparatus 101 via the communication unit 506, the service management unit 505 executes S1602.

At S1602, the service management unit 505 determines whether the target service for which the device information stored in the database 110 is to be transmitted to the management apparatus 101 is installed before the uninstallation process. The target service is to be set in advance. In the example, the job log service and the setting delivery service are assumed as the target services as an example, but the present embodiment is not limited to this.

When determining that the target service is installed (Yes at S1602), the service management unit 505 moves the process to step S1603.

At S1603, the service management unit 505 provides an instruction for transmitting all the device information stored in the database 110 to the management apparatus 101 for the target service (for example, the job log service and the setting delivery service). In accordance with the instruction, all the device information stored in the database 110 is transmitted to the management apparatus 101 in the target service. At this time, in the target service, the device information is transmitted by sending a request for transmitting data including the client ID and the authentication key used by the monitor apparatus 108 (data transmission request) to the management apparatus 101. Upon completion of transmission of the device information in the target service, the uninstallation processing unit 504 executes S1604.

When the service management unit 505 does not determine at S1602 that any target service is installed (No at S1602), the uninstallation processing unit 504 executes S1604.

At S1604, the uninstallation processing unit 504 executes the uninstallation and ends the process of the flowchart.

<Flowchart of a Process of Receiving Data from the Monitor Apparatus 108 in the Management Apparatus 101>

Figure 17:
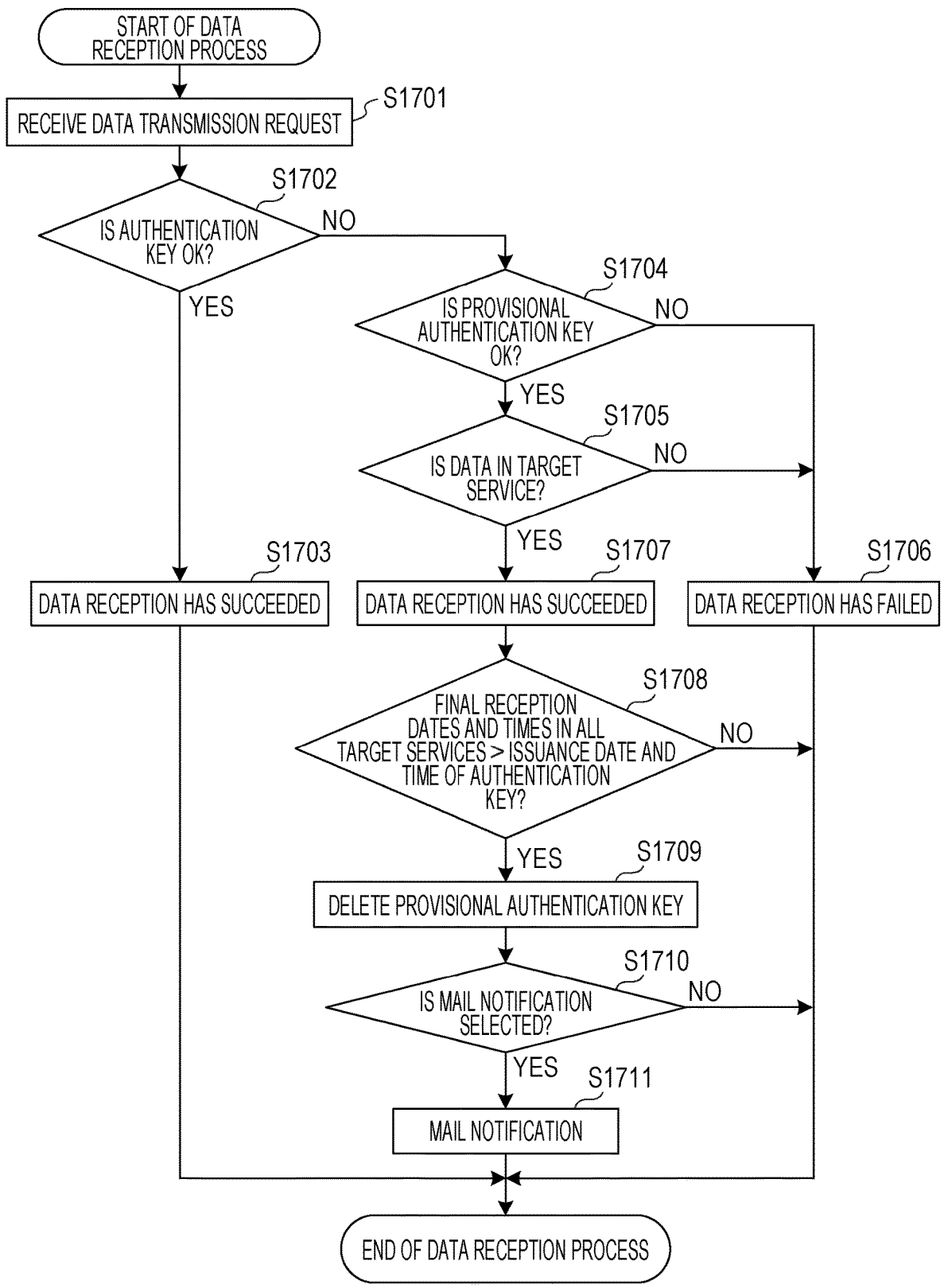
FIG. 17 is a flowchart of a process of receiving data from the monitor apparatus in the management apparatus.

FIG. 17 is a flowchart of a process of receiving data in the management apparatus 101 according to the example. The steps in the flowchart are carried out by the CPU 201 provided in the management apparatus 101 reading the control program of the present invention stored in a non-volatile memory such as the ROM 202 or the HDD 212 and executing the same.

At step S1701, when the service management unit 408 receives the data transmission request sent from the monitor apparatus 108 via the communication unit 410, the authentication key management unit 404 executes S1702.

At S1702, the authentication key management unit 404 searches the monitor apparatus list (as illustrated in FIG. 8, for example) with the client ID and the authentication key included in the request received at S1701 to determine whether the authentication key is correct in the registered monitor apparatus. The authentication key management unit 404 determines that the authentication key is correct when the pair of the client ID and the authentication key included in the request is identical to the pair of the client ID and the authentication key included in the monitor apparatus list, and does not determine that the authentication key is correct in the other situation.

When the authentication key management unit 404 determines that the authentication key is correct (the authentication key is OK) (Yes at S1702), the service management unit 408 executes S1703.

At S1703, the service management unit 408 returns information indicating the success of the data reception as a response to the data transmission request received at S1701 to the source of the request made at S1701. The service management unit 408 provides an instruction for storing in the database 102 the data received in response to the request made at S1701 in the services. In accordance with the instruction, the data received at S1702 is stored in the database 102 in the services. After S1703, the service management unit 408 ends the process of the flowchart.

When not determining that the authentication key is correct (No at S1702), the authentication key management unit 404 executes S1704.

At S1704, the authentication key management unit 404 determines whether the authentication key included in the request received at S1701 is identical to the corresponding provisional authentication key 806.

When the authentication key management unit 404 does not determine that the authentication key is identical to the provisional authentication key 806 (No at S1704), the service management unit 408 executes S1706.

At S1706, the service management unit 408 returns information indicating the failure of the data reception as a response to the data transmission request received at S1701 to the source of the request made at S1701. After S1706, the service management unit 408 ends the process of the flowchart.

When the authentication key management unit 404 determines that the authentication key is identical to the provisional authentication key 806 (the provisional authentication key is OK) (Yes at S1704), the service management unit 408 executes S1705.

At S1705, the service management unit 408 determines whether the data received at S1701 is the data to be received in the target service sent from the pre-replacement monitor apparatus 108. In the example, the job log service and the setting delivery service are assumed as examples of the target service to be received, but the present embodiment is not limited to this.

When not determining that the data is to be received in the target service (No at S1705), the service management unit 408 executes S1706. S1706 has previously been described and thus description thereof is omitted herein.

When determining that the data is to be received in the target service (Yes at S1705), the service management unit 408 executes S1707.

At S1707, the service management unit 408 returns information indicating the success of the data reception as a response to the data transmission request received at S1701 to the source of the request made at S1701. The service management unit 408 provides an instruction for storing in the database 102 the data received in response to the request made at S1701 in the services. In accordance with the instruction, the data received in response to the request at S1702 is stored in the database 102 in the services.

Next, at S1708, the authentication key management unit 404 determines whether all the target data to be received from the pre-replacement monitor apparatus 108 has been received. The authentication key management unit 404 determines that all the data has been received when all the final receiving dates and times 904 in the target services in the service-based data management list (as illustrated in FIG. 9, for example) are later than the authentication key issuance date and time 805 in the monitor apparatus list (as illustrated in FIG. 8, for example), and determines that there is data yet to be received in the other situation.

When determining that any of the final receiving dates and times 904 in the target services in the service-based data management list (as illustrated in FIG. 9, for example) is earlier than the authentication key issuance date and time 805 in the monitor apparatus list (as illustrated in FIG. 8, for example) (No at S1708), the authentication key management unit 404 ends the process of the flowchart and waits for the next data reception.

When determining that all the final receiving dates and times 904 in the target services in the service-based data management list are later than the authentication key issuance date and time 805 in the monitor apparatus list (Yes at S1708), the authentication key management unit 404 moves the process to S1709.

At S1709, the authentication key management unit 404 deletes the provisional authentication key 806.

Next, at S1710, the replacement processing unit 405 determines whether the mail notification is specified in the replacement process based on the information on the uninstallation method (not illustrated) stored in the monitor apparatus list, that corresponds to the client ID included in the request received at S1701.

When the replacement processing unit 405 determines that the mail notification is specified (Yes at S1710), the mail management unit 409 executes S1711.

At S1711, the mail management unit 409 transmits mail for notifying the uninstallation timing to the mail address corresponding to the client ID included in the request received at S1701 and set in the information on the uninstallation method (not illustrated) stored in the monitor apparatus list, and ends the process of the flowchart.

When the replacement processing unit 405 does not determine that the mail notification is specified (No at S1710), the process of the flowchart ends.

<Flowchart of the Process of Producing the Monitor Apparatus Module in the Management Apparatus 101>

Figure 18:
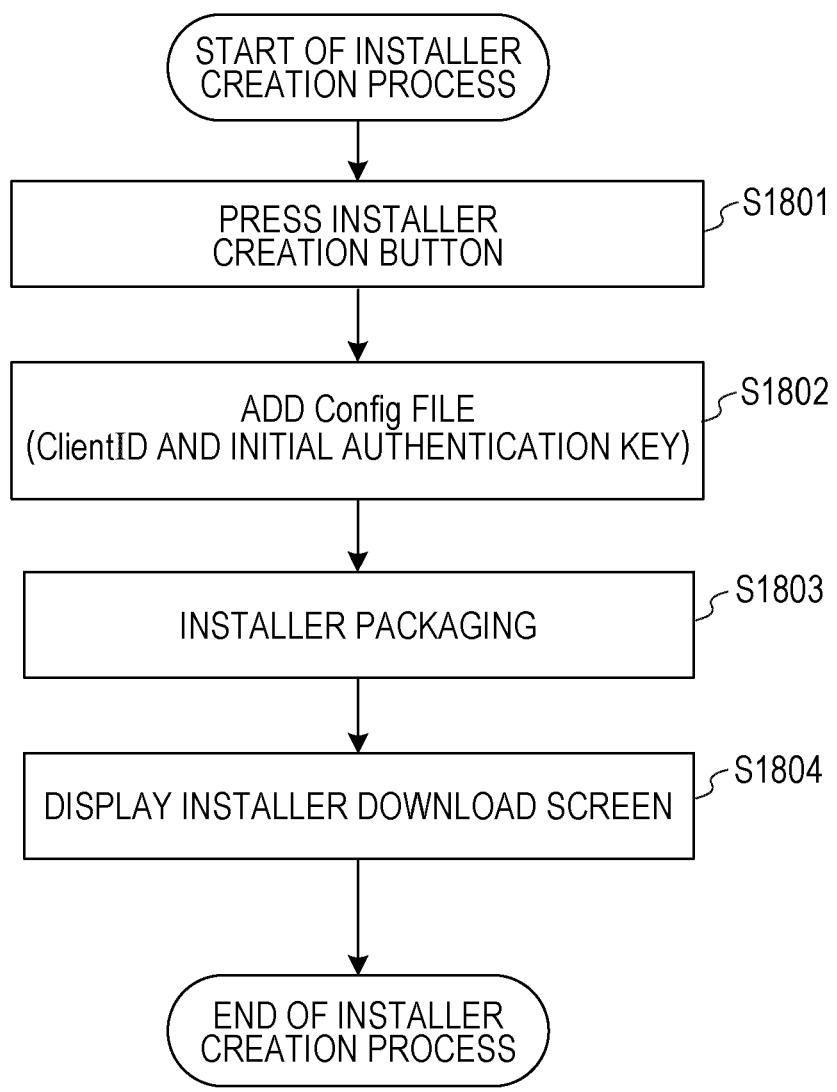
FIG. 18 is a flowchart of a process of creating a monitor apparatus module in the management apparatus.

FIG. 18 is a flowchart of a process of creating a monitor apparatus module in the management apparatus 101 according to the example. The steps in the flowchart are carried out by the CPU 201 provided in the management apparatus 101 reading the control program of the present invention stored in a non-volatile memory such as the ROM 202 or the HDD 212 and executing the same.

Upon receipt of access to a predetermined URL by a person in charge with specific authority from a web browser executed on a PC or the like, the UI control unit 401 displays and controls an installer creation screen (not illustrated) on the web browser. Then, at step S1801, when the UI control unit 401 detects that an installer creation button (not illustrated) on the installer creation screen is pressed by the person in charge with specific authority from the web browser, the installer generation unit 406 executes S1802.

At S1802, the installer generation unit 406 adds the customer ID 801, the client ID 802, and the initial authentication key 803 to a Config file stored in the database 102.

Next, at S1803, the installer generation unit 406 sets the module necessary for installation stored in the database 102 and the Config file additionally written at S1802 together as an installer package.

Next, at S1804, the UI control unit 401 displays an installer download screen on the web browser. The installer package can be downloaded from the web browser at any time by the person in charge with specific authority. After S1804, the UI control unit 401 ends the process of the flowchart.

According to the example, when the monitor apparatus module is installed into a PC, the authentication key 804 related to the identification information (client ID 802) for the monitor apparatus included in the installer is already issued, the management apparatus 101 makes a response for notifying the failure of the initial registration to the PC. In the event of failure of the initial registration, the PC displays an input screen for ticket information issued by the management apparatus 101 (as illustrated in FIG. 12, for example) to accept input of ticket information. When a ticket is input and an instruction for continuing installation (registration) is provided from the screen, the PC resends the initial registration request with the ticket information to the management apparatus 101. The management apparatus 101 checks whether the ticket included in the initial registration request is valid. When the ticket is valid, the management apparatus 101 executes the registration process of the monitor apparatus. After the registration, the management apparatus 101 deletes the ticket and reissues the authentication key 804 for use at the time of communication. Accordingly, general connection from the pre-replacement monitor apparatus is denied. However, the management apparatus 101 can hold the authentication key before the reissuance as a provisional authentication key and permit only specific connection from the pre-replacement monitor apparatus. The specific connection refers to connection for the monitor apparatus 108 to transmit to the management apparatus 101 specific device information stored in the database 110 by the pre-replacement monitor apparatus 108 before the replacement, for example. According to this configuration, it is possible to reduce a burden on the administrator and the like at the time of replacement of the monitor apparatus 108 and enable safe replacement of the monitor apparatus. Therefore, in the case where the information related to the license such as an authentication key is included in the installer of the monitor apparatus module for distribution from the viewpoint of convenience at the time of installation, even though the monitor apparatus needs to be replaced, the administrator and the like do not need to make initial settings. This reduces a burden on the administrator and the like.

In the example, in the event of failure of the initial registration request, the input of ticket information is accepted on the ticket information input screen and the initial registration request with the input ticket information is resent to the management apparatus 101. Alternatively, the input of ticket information can be allowed before the transmission of the first initial registration request such that the first initial registration request with the input ticket information can be transmitted to the management apparatus 101. For example, before the transmission of the first initial registration request, the registration processing unit 503 can display on the ticket input screen a message saying "If a ticket for replacement of the monitor apparatus module is issued, input it and go ahead. If there is no ticket, go ahead directly," for example, thereby to prompt the operator to input the ticket in advance.

The configurations and contents of the foregoing various data are not limited to those described above but the data can be configured in a wide variety of manners depending on the usage and purpose.

One embodiment has been described so far. However, the embodiment can be carried out in such modes as system, apparatus, method, program, or storage medium. Specifically, the embodiment can be applied to a system composed of a plurality of devices or an apparatus composed of a single device.

Additional embodiments can include all combinations of the foregoing examples.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-078586, filed Apr. 11, 2016, which is hereby incorporated by reference herein in its entirety.

What is claimed is:

1. A system comprising:
a management system;
a first information processing apparatus operating as a monitor apparatus, wherein the first information processing apparatus receives authentication information used for communication between the monitor apparatus and the management system; and
a second information processing apparatus, wherein the management system comprises:
at least one processor; and
a memory coupled to the at least one processor, the memory having instructions that, when executed by the processor, performs operations as:
a generation unit configured to, based on an instruction to generate a ticket for the monitor apparatus of the first information processing apparatus, generate ticket information and provide the generated ticket information;
a management unit configured to manage the generated ticket information in association with identification information of the monitor apparatus;
wherein the second information processing apparatus comprises:
an input unit configured to accept input of ticket information;
a transmission unit configured to transmit, to the management system, a registration request including the identification information of the monitor apparatus and the input ticket information;
a first reception unit configured to receive the registration request and the ticket information from the second information processing apparatus;
an issuing unit configured to, in a case where the received ticket information from the second information processing apparatus coincides with the ticket information managed in association with the identification information included in the received registration request, reissue and provide authentication information to the second information processing apparatus;
an instruction unit configured to, in a case where the reissued authentication information is provided to the second information processing apparatus, instruct the first information processing apparatus to uninstall a program for the monitor apparatus;
wherein the second information processing apparatus further comprises:
at least one processor; and
a memory coupled to the at least one processor, the memory having instructions that, when executed by the processor, performs operations as:
a second reception unit configured to receive the reissued authentication information from the management system;

wherein the first information processing apparatus comprises:
   at least one processor; and
   a memory coupled to the at least one processor, the memory having instructions that, when executed by the processor, performs operations as:
   an uninstallation unit configured to, in a case where the instruction for uninstallation of the program for the monitor apparatus has been received from the management system, transmit, to the management system, specific monitoring data acquired as the monitor apparatus from a device and uninstall the program.

2. The system according to claim 1,
   wherein, when the first reception unit receives the registration request without ticket information and the authentication information is previously issued for the monitor apparatus of the identification information included in the received registration request, the management system provides a response for notifying failure of the registration request to the second information processing apparatus,
   wherein, in an event the registration request fails, the input unit provides a screen for inputting the ticket information from a Web application operating on the second information processing apparatus and accepts input of the ticket information via the screen, and
   wherein the transmission unit resends the registration request with the input ticket information to the management system.

3. The system according to claim 1,
   wherein the instruction for generating the ticket includes a specification whether the program is to be automatically uninstalled, and
   wherein when the instruction for generating the ticket includes the specification of automatically uninstalling the program, the instruction unit instructs the first information processing apparatus to uninstall the program.

4. A method for a system comprising:
   receiving authentication information, by a first information processing apparatus, used for communication between a monitor apparatus and a management system; and
   generating, based on an instruction to generate a ticket for the monitor apparatus of the first information processing apparatus, ticket information and providing the generated ticket information;
   managing the generated ticket information in association with identification information of the monitor apparatus;
   accepting input of ticket information;
   transmitting, to the management system, a registration request including the identification information of the monitor apparatus and the input ticket information;
   receiving the registration request and the ticket information from a second information processing apparatus;
   reissuing and providing, in a case where the received ticket information from the second information processing apparatus coincides with the ticket information managed in association with the identification information included in the received registration request, authentication information to the second information processing apparatus;
   instructing, in a case where the reissued authentication information is provided to the second information processing apparatus, the first information processing apparatus to uninstall a program for the monitor apparatus;
   receiving the reissued authentication information from the management system;
   transmitting, in a case where the instruction for uninstallation of the program for the monitor apparatus has been received from the management system, to the management system, specific monitoring data acquired as the monitor apparatus from a device and uninstall the program.

5. The method according to claim 4,
   wherein, when the receiving the registration request without ticket information and the authentication information is previously issued for the monitor apparatus of the identification information included in the received registration request, the management system provides a response for notifying failure of the registration request to the second information processing apparatus,
   wherein, in an event the registration request fails, the accepting provides a screen for inputting the ticket information from a Web application operating on the second information processing apparatus and accepts input of the ticket information via the screen, and
   wherein the transmitting resends the registration request with the input ticket information to the management system.

6. The method according to claim 4,
   wherein the instruction for generating the ticket includes a specification whether the program is to be automatically uninstalled, and
   wherein when the instruction for generating the ticket includes the specification of automatically uninstalling the program, the instructing instructs the first information processing apparatus to uninstall the program.

* * * * *